United States Patent
Ko et al.

(10) Patent No.: US 9,762,344 B2
(45) Date of Patent: Sep. 12, 2017

(54) METHOD FOR TRANSMITTING AND RECEIVING SIGNAL IN MULTI-CELL COOPERATIVE COMMUNICATION SYSTEM AND APPARATUS THEREFOR

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Hyunsoo Ko, Seoul (KR); Kwangsoon Kim, Seoul (KR); Kyungjun Choi, Seoul (KR); Jaehoon Chung, Seoul (KR); Jinmin Kim, Seoul (KR)

(73) Assignees: LG Electronics Inc., Seoul (KR); Industry-Academic Cooperation Foundation, Yonsei University, Seoul (KR)

(*) Notice: Subject to any disclaimer, the term of this patent is extended or adjusted under 35 U.S.C. 154(b) by 85 days.

(21) Appl. No.: 14/759,847

(22) PCT Filed: Jan. 22, 2014

(86) PCT No.: PCT/KR2014/000615
§ 371 (c)(1),
(2) Date: Jul. 8, 2015

(87) PCT Pub. No.: WO2014/116019
PCT Pub. Date: Jul. 31, 2014

(65) Prior Publication Data
US 2015/0358102 A1    Dec. 10, 2015

Related U.S. Application Data

(60) Provisional application No. 61/754,974, filed on Jan. 22, 2013.

(51) Int. Cl.
H04W 72/04    (2009.01)
H04J 11/00    (2006.01)
(Continued)

(52) U.S. Cl.
CPC ....... *H04J 11/0053* (2013.01); *H04J 11/0056* (2013.01); *H04L 5/0023* (2013.01);
(Continued)

(58) Field of Classification Search
CPC .............. H01J 11/0053; H01J 11/0056; H01J 11/0023; H01J 11/0004; H04L 5/0023;
(Continued)

(56) References Cited

U.S. PATENT DOCUMENTS

2007/0072551 A1* 3/2007 Pajukoski ............ H04B 7/0857
455/63.1
2011/0194594 A1    8/2011 Noh et al.
(Continued)

FOREIGN PATENT DOCUMENTS

CN    WO2012062166    *   5/2012 ............ H04W 16/18
KR    10-2011-0027925 A        3/2011
(Continued)

*Primary Examiner* — Brandon Renner
(74) *Attorney, Agent, or Firm* — Birch, Stewart, Kolasch & Birch, LLP

(57) ABSTRACT

The present invention relates to a method for transmitting and receiving signals in a wireless communication system. Specifically, in a multi-cell cooperative communication system, a base station can form cooperative detection user set information by detecting a terminal within a cell and form cooperative processing user set by receiving the cooperative detection user set information of a neighboring base station. At this time, the base station acquires information about a base station adjacent to the neighboring base station and designs an efficient filter in transmitting and receiving
(Continued)

signals of terminals between the base stations, thereby being capable of removing inter-cell interference signals.

10 Claims, 17 Drawing Sheets

(51) Int. Cl.
*H04L 5/00* (2006.01)
*H04W 8/00* (2009.01)
*H04W 4/02* (2009.01)
*H04L 5/14* (2006.01)

(52) U.S. Cl.
CPC ........... *H04L 5/0048* (2013.01); *H04W 4/023* (2013.01); *H04W 8/005* (2013.01); *H04W 72/048* (2013.01); *H04L 5/0035* (2013.01); *H04L 5/0053* (2013.01); *H04L 5/0055* (2013.01); *H04L 5/0057* (2013.01); *H04L 5/0073* (2013.01); *H04L 5/1469* (2013.01)

(58) Field of Classification Search
CPC ... H04L 5/0048; H04L 5/0035; H04L 5/0053; H04L 5/0057; H04L 5/0073; H04L 5/1469; H04W 4/0023; H04W 8/005; H04W 72/0048

USPC ........................................................ 370/252
See application file for complete search history.

(56) References Cited

U.S. PATENT DOCUMENTS

| | | | |
|---|---|---|---|
| 2012/0184218 A1 | 7/2012 | Boudreau et al. | |
| 2012/0244884 A1* | 9/2012 | Lim et al. ............. | H04W 4/023 455/456.2 |
| 2013/0223272 A1* | 8/2013 | Tao et al. ................ | H04B 7/024 370/252 |
| 2013/0343317 A1* | 12/2013 | Etemad .................. | H04B 7/024 370/329 |
| 2014/0018115 A1* | 1/2014 | Zhuang .................. | H04B 7/024 455/501 |
| 2014/0161054 A1* | 6/2014 | Sandberg ............. | H04B 7/0452 370/329 |

FOREIGN PATENT DOCUMENTS

| | | |
|---|---|---|
| KR | 10-2011-0092478 A | 8/2011 |
| WO | WO 2012/126514 A1 | 9/2012 |
| WO | WO 2013/003617 A2 | 1/2013 |

\* cited by examiner

FIG. 6
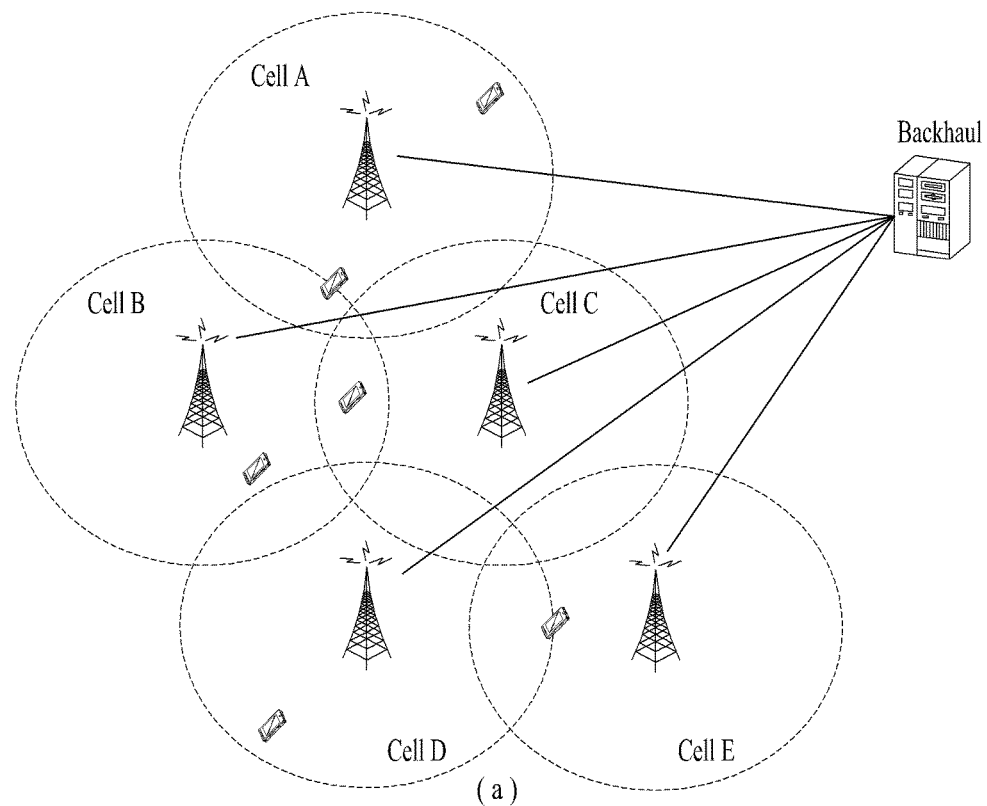
(a)
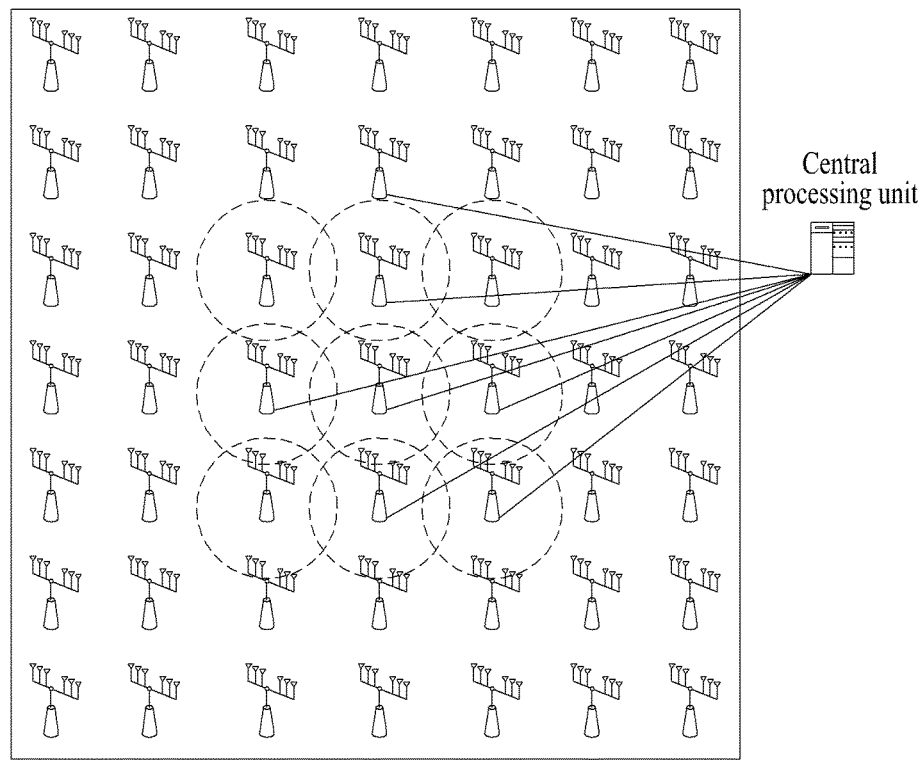
(b)

1-1 ~ 1-3 : cooperative detection UE aggregate
1-1 ~ 9-3 : cooperative processing UE aggregate
  1 ~ 25  : cooperative processing cell aggregate FIG. 18
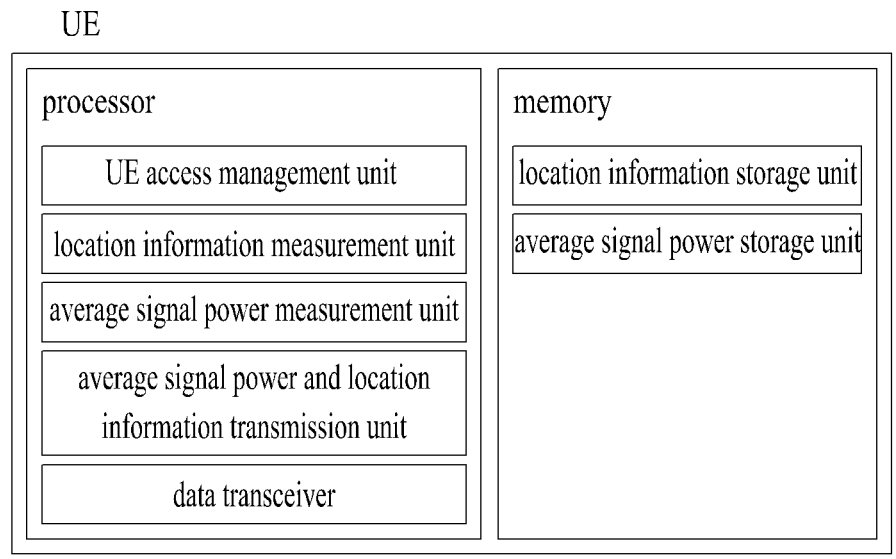
(a)
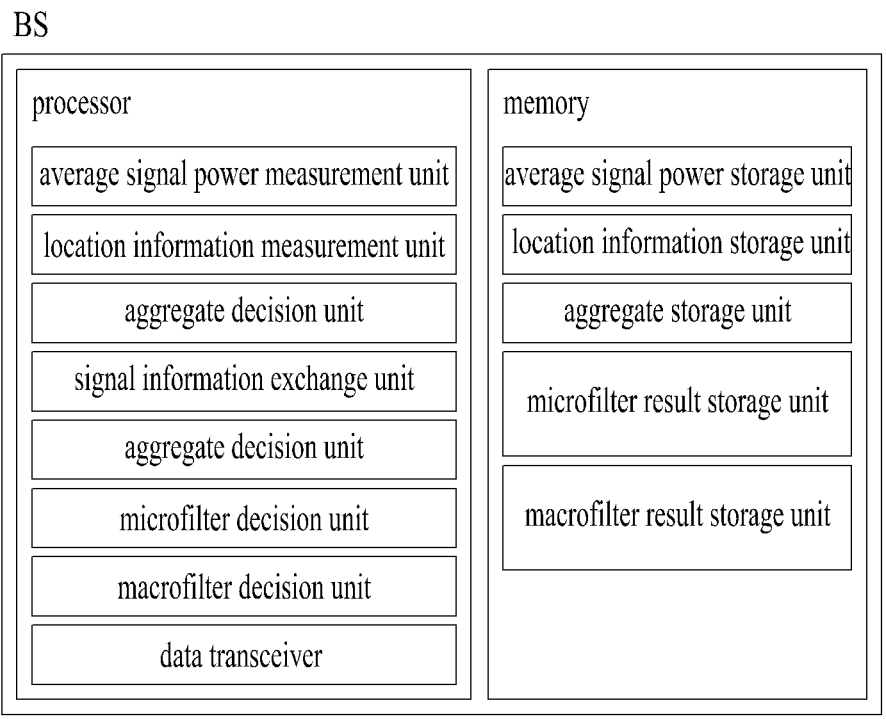
(b)

METHOD FOR TRANSMITTING AND RECEIVING SIGNAL IN MULTI-CELL COOPERATIVE COMMUNICATION SYSTEM AND APPARATUS THEREFOR

CROSS REFERENCE TO RELATED APPLICATIONS

This application is the National Phase of PCT International Application No. PCT/KR2014/000615, filed on Jan. 22, 2014, which claims priority under 35 U.S.C. 119(e) to U.S. Provisional Application No. 61/754,974, filed on Jan. 22, 2013, all of which are hereby expressly incorporated by reference into the present application.

TECHNICAL FIELD

The present invention relates to a wireless communication system, and more particularly to a method and apparatus for transmitting and receiving signals in a time division multi-cell cooperative communication system. More specifically, the present invention relates to a method and apparatus for reducing inter-cell interference (ICI) by sharing user equipment (UE) information between base stations (BSs).

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

Conventionally, one transmission (Tx) antenna and one reception (Rx) antenna are used. MIMO technology is an abbreviation for Multiple Input Multiple Output technology. MIMO technology uses a plurality of transmission (Tx) antennas and a plurality of reception (Rx) antennas to improve the efficiency of transmission and reception (Tx/Rx) of data. In other words, MIMO technology allows a transmission end or reception end of a wireless communication system to use multiple antennas (hereinafter referred to as multi-antenna technology), so that capacity or performance can be improved. For convenience of description, the term "MIMO" can also be considered to be multi-antenna technology.

In more detail, MIMO technology is not dependent on a single antenna path to receive a single message. Instead, MIMO technology collects a plurality of data fragments received via several antennas, merges the collected data fragments, and completes total data. As a result, MIMO technology can increase a data transfer rate within a predetermined-sized cell region, or can increase system coverage while guaranteeing a specific data transfer rate. Under this situation, MIMO technology can be widely applied to mobile communication terminals, repeaters, or the like. MIMO technology can extend the range of data communication, so that it can overcome the limited transmission (Tx) capacity of mobile communication systems.

The number of transmission (Tx) antennas in a transmitter is $N_T$, and the number of reception (Rx) antennas in a receiver is $N_R$. In this way, theoretical channel transmission capacity of the MIMO communication system increases when both the transmitter and the receiver use a plurality of antennas, as compared to another case in which only the transmitter or the receiver uses several antennas. The theoretical channel transmission capacity of the MIMO communication system increases in proportion to the number of antennas. Therefore, transfer rate and frequency efficiency are greatly increased. Provided that a maximum transfer rate acquired when a single antenna is used is set to $R_o$, a transfer rate acquired when multiple antennas are used can theoretically increase by a predetermined amount that corresponds to the maximum transfer rate ($R_o$) multiplied by a rate of increase $R_i$.

For example, provided that a MIMO system uses four transmission (Tx) antennas and four reception (Rx) antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase a data transfer rate using such theoretical capacity increase. Some of the above technologies have been implemented in a variety of wireless communication standards, for example, a next-generation wireless LAN, etc.

The MIMO system uses a plurality of Tx antennas and a plurality of Rx antennas, and can overcome the fading influence generated in a radio frequency (RF) channel through a plurality of Tx/Rx paths. Therefore, the MIMO system can increase data transfer rate and transmission quality as compared to a single antenna system. However, the MIMO system requires a sufficiently long distance between a plurality of antennas so as to obtain a high transfer rate. The base station (BS) transmits and receives signals within a large coverage, so that antennas spaced apart from each other by a sufficiently long distance can be installed between the BSs. However, actually, a miniaturized user equipment (UE) has difficulty in guaranteeing a sufficiently long distance. Therefore, a Multi-User MIMO system in which UEs having a single antenna can communicate with the BS having multiple antennas is being intensively researched as part of LTE-Advanced of the 3GPP.

In the multi-cell environment, a transfer rate and quality of a UE located at a cell edge are considerably deteriorated by an inter-cell interference (ICI) generated from neighbor cells. In order to overcome this issue, a frequency reuse scheme for reducing interference by allocating orthogonal frequency resources between contiguous cells may be used. However, the frequency reuse scheme can improve a transfer rate and quality of a UE located at a cell edge, and at the same time can deteriorate the transfer rate and quality of a total network. In order to address this issue, a Coordinated Multi-Point (COMP) scheme based on coordination between multiple cells may be used to reduce ICI by efficiently employing frequency resources. This scheme forms a virtual MIMO system by exchanging channel information or data between multiple cells.

Channel information between antennas is needed for efficient data transmission/reception in the MU-MIMO system. A time division cellular system allows the BS to allocate pilot resources to a UE so as to obtain such channel information. The UE transmits a predetermined pilot sequence to the BS through the allocated pilot resources, and the BS may estimate channel information upon receiving pilots. The amount of necessary pilot resources increases in proportion to the number of UEs, and the amount of pilot resources is limited, so that it is impossible to allocate orthogonal pilot resources among multiple cells to all UEs. Therefore, it is impossible to perfectly estimate a UE channel due to the reuse of pilots, and Tx/Rx filters based on the estimated channel may generate unexpected interference. Performance deterioration caused by reuse of pilot resources may become serious in a cooperative cellular environment.

Therefore, in order to obtain a high transfer rate and high quality by suppressing interference in a multi-cell cooperative communication system, a process for controlling interference generated from pilots is required for the multi-cell cooperative communication system. In other words, the BS must allocate optimum pilot resources to each UE, and the BS must estimate a channel between UEs using given pilot resources, so that the BS must design Tx/Rx filters on the basis of the estimated channel. In addition, in order to maximize a transfer rate, a method for designing an optimum scheme between the above-mentioned steps is of importance. Therefore, a method for designing the improved Tx/Rx filter capable of removing inter-cell interference (ICI) and/or interference between UEs on the basis of the estimated channel is needed.

DISCLOSURE

Technical Problem

An object of the present invention is to provide a method and apparatus for transmitting and receiving signals in a wireless communication system. Another object of the present invention is to provide a method and apparatus for sharing UE information between base stations (BSs), transmitting and receiving signals to and from the UE on the basis of the shared result, and thus removing an interference signal.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a signal by a base station (BS) for use in a wireless communication system includes: generating, by a first BS, cooperative detection user equipment (UE) set information by searching for a UE contained in a cell of the first BS; acquiring, by the first BS, cooperative detection UE set information detected by a second BS, from the second BS, wherein the second BS is at least one cooperative BS adjacent to the first BS; updating cooperative processing UE set information of the first BS based on the cooperative detection UE set information detected by the first BS and the cooperative detection UE set information acquired from the second BS; updating, by the first BS, a cooperative processing cell set of the first BS based on the cooperative processing UE set information; and receiving, by the first BS, a signal from a UE located in a cell of the first BS based on the updated cooperative processing UE set information and the updated cooperative processing cell set information, wherein the updating of the cooperative processing cell set information of the first BS is performed by acquiring third BS information contained in the cooperative processing UE set information, and the third BS being at least one cooperative BS adjacent to the second BS.

The receiving of the signal from the inter-cell UE by the first BS may include: performing a first filtering process for removing an interference signal of the UE located in the cell of the first BS; and performing a second filtering process for removing an interference signal of a UE not located in a cell of the first BS.

A filter for use in the first filtering process and the second filtering process may be a maximum ratio combining (MRC) filter.

The cooperative detection UE set information may include location information of the UE located in the cell of the first BS.

The cooperative detection UE set information may include average signal power information of the UE located in the cell of the first BS.

The first BS may schedule a plurality of UEs.

The first BS may share information with the second BS and the third BS through a backhaul server.

The first BS may be independently detected per cooperative detection UE of the cooperative detection UE set.

Each of the BS and the UEs may include a unique identifier (ID).

The BS and UE identifiers (IDs) detected by the first BS may be stored, as a list form, in the first BS.

The method may further include: transmitting, by the first BS, an acknowledgement (ACK) signal in response to signal transmission of the UE located in the cell of the first BS.

The cell of the first BS may include at least one sub-cell, and the cooperative detection UE set information may be constructed per sub-cell.

In accordance with another aspect of the present invention, a method for transmitting/receiving a signal to/from a base station (BS) by a user equipment (UE) for use in a wireless communication system includes: searching for, by the UE, a UE located in a cell of a serving BS of the UE; determining, by the UE, a relative location of the searched UE; determining, by the UE, a cooperative detection UE set on the basis of the determined UE location information; and transmitting information regarding the determined cooperative detection UE set to the serving BS.

In accordance with another aspect of the present invention, a base station (BS) for transmitting and receiving a signal to and from a user equipment (UE) for use in a wireless communication system includes: a transceiver; and a processor. The processor is configured to generate cooperative detection user equipment (UE) set information by searching for a UE contained in a cell of the first BS, allows the first BS to acquire cooperative detection UE set information detected by a second BS from the second BS, to update cooperative processing UE set information of the first BS based on the cooperative detection UE set detected by the first BS the cooperative detection UE set acquired from the second BS, to update a cooperative processing cell set of the first BS based on the cooperative processing UE set information, and to receive a signal from a UE located in a cell of the first BS based on the updated cooperative processing UE set information and the updated cooperative processing cell set information. The updating of the cooperative processing cell set information of the first BS may performed by acquiring third BS information contained in the cooperative processing UE set information, the second BS is at least one cooperative BS adjacent to the first BS, and the third BS is at least one cooperative BS adjacent to the second BS.

Advantageous Effects

As is apparent from the above description, the embodiments of the present invention can efficiently transmit and receive a reference signal (RS) and a data signal in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 6 is a conceptual diagram illustrating a multi-cell cooperative communication system.

FIG. 18 is a block diagram illustrating UE and BS functions according to an embodiment of the present invention.

BEST MODE

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

In a wireless communication system, the UE may receive information from the base station (BS) via a downlink, and may transmit information via an uplink. The information that is transmitted and received to and from the UE includes data and a variety of control information. A variety of physical channels are used according to categories/usages of transmission (Tx) and reception (Rx) information of the UE.

Figure 1:
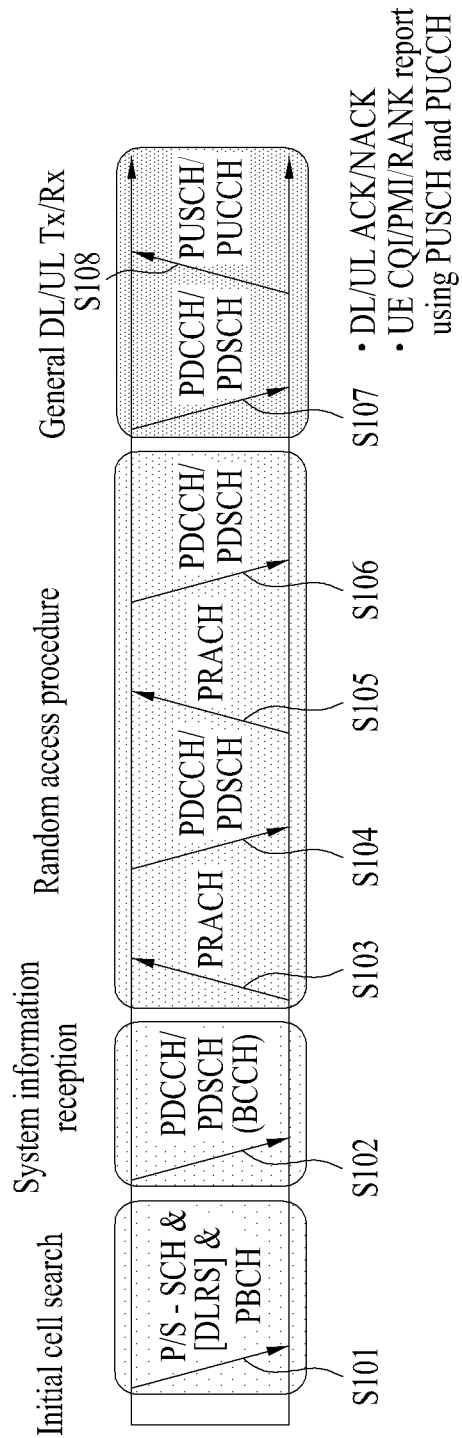
FIG. 1 is a conceptual diagram illustrating physical channels used in a 3GPP LTE system as an exemplary wireless communication system and a general method for transmitting a signal using the physical channels.

FIG. 1 is a diagram showing physical channels used in a 3GPP system and a general signal transmission method using the same.

A UE performs an initial cell search procedure such as establishment of synchronization with a BS when power is turned on or the UE enters a new cell (step S101). The UE may receive a Primary Synchronization Channel (P-SCH) and a Secondary Synchronization Channel (S-SCH) from the BS to establish synchronization with the BS and acquire information such as a cell identity (ID). Thereafter, the UE may receive a physical broadcast channel from the BS to acquire broadcast information within the cell. Meanwhile, the UE may receive a Downlink Reference Signal (DL RS) in the initial cell search step to confirm a DL channel state.

Upon completion of the initial cell search procedure, the UE may receive a Physical Downlink Control Channel (PDCCH) and a Physical Downlink Shared Channel (PDSCH) according to information included in the PDCCH to acquire more detailed system information (step S102).

Thereafter, if the UE initially accesses the BS or if radio resources for signal transmission are not present, the UE may perform a random access procedure (steps S103 to S106) with respect to the BS. To this end, the UE may transmit a specific sequence through a Physical Random Access Channel (PRACH) as a preamble (steps S103 and S105), and receive a response message to the preamble through the PDCCH and the PDSCH corresponding thereto (steps S104 and S106). In the case of a contention-based RACH, a contention resolution procedure may be additionally performed.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), a Channel Quality Indicator (CQI), a Precoding Matrix Indicator (PMI), a Rank Indicator (RI), etc. In the present specification, HARQ ACK/NACK is briefly referred to as HARQ-ACK or ACK/NACK (A/N). HARQ-ACK includes at least one of a positive ACK (ACK), a negative ACK (NACK), DTX and NACK/DTX. The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Frame structure is described with reference to FIG. 2 as follows. In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

Figure 2:
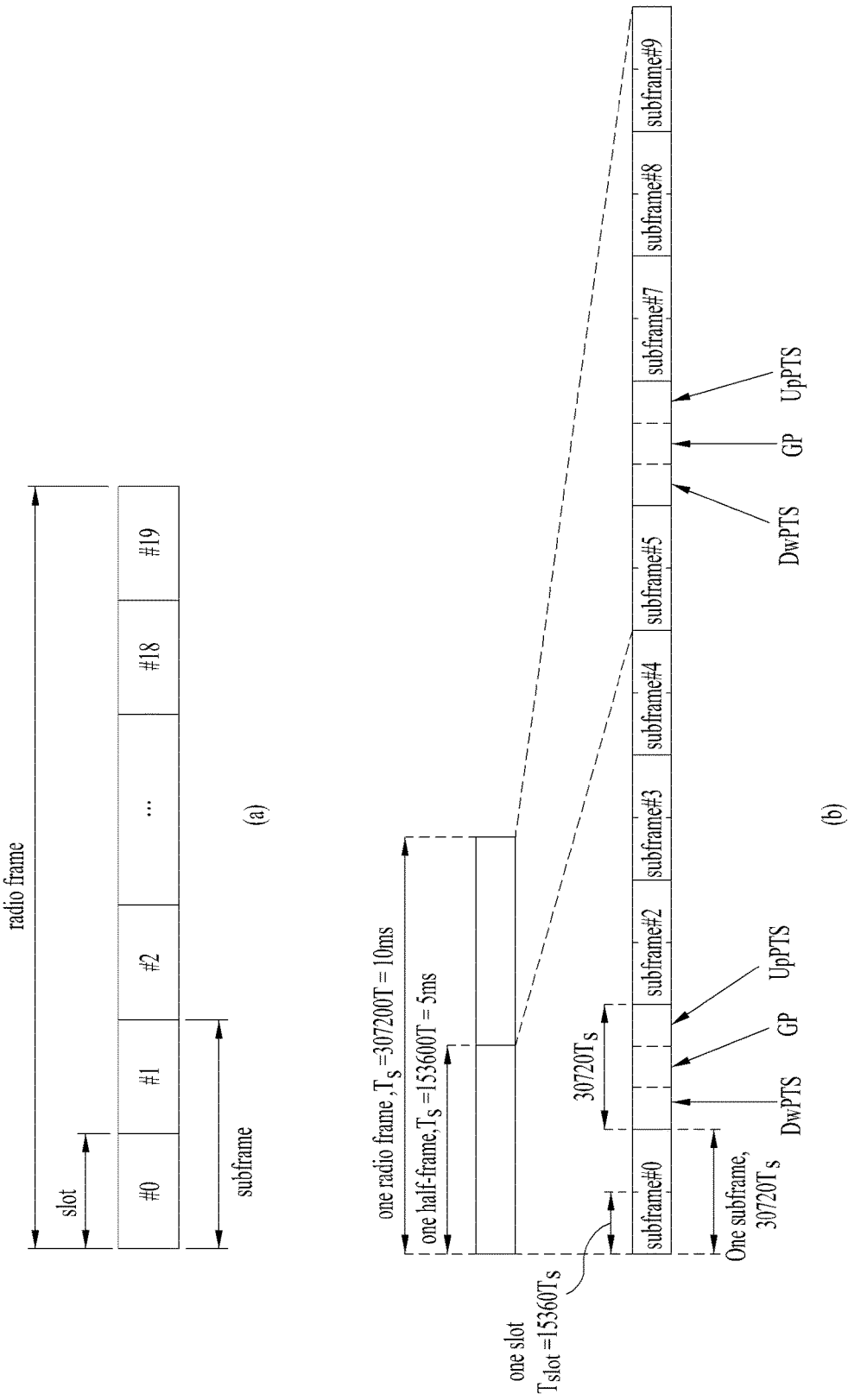
FIG. 2 exemplarily shows a radio frame structure.

FIG. 2 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal. CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 3:
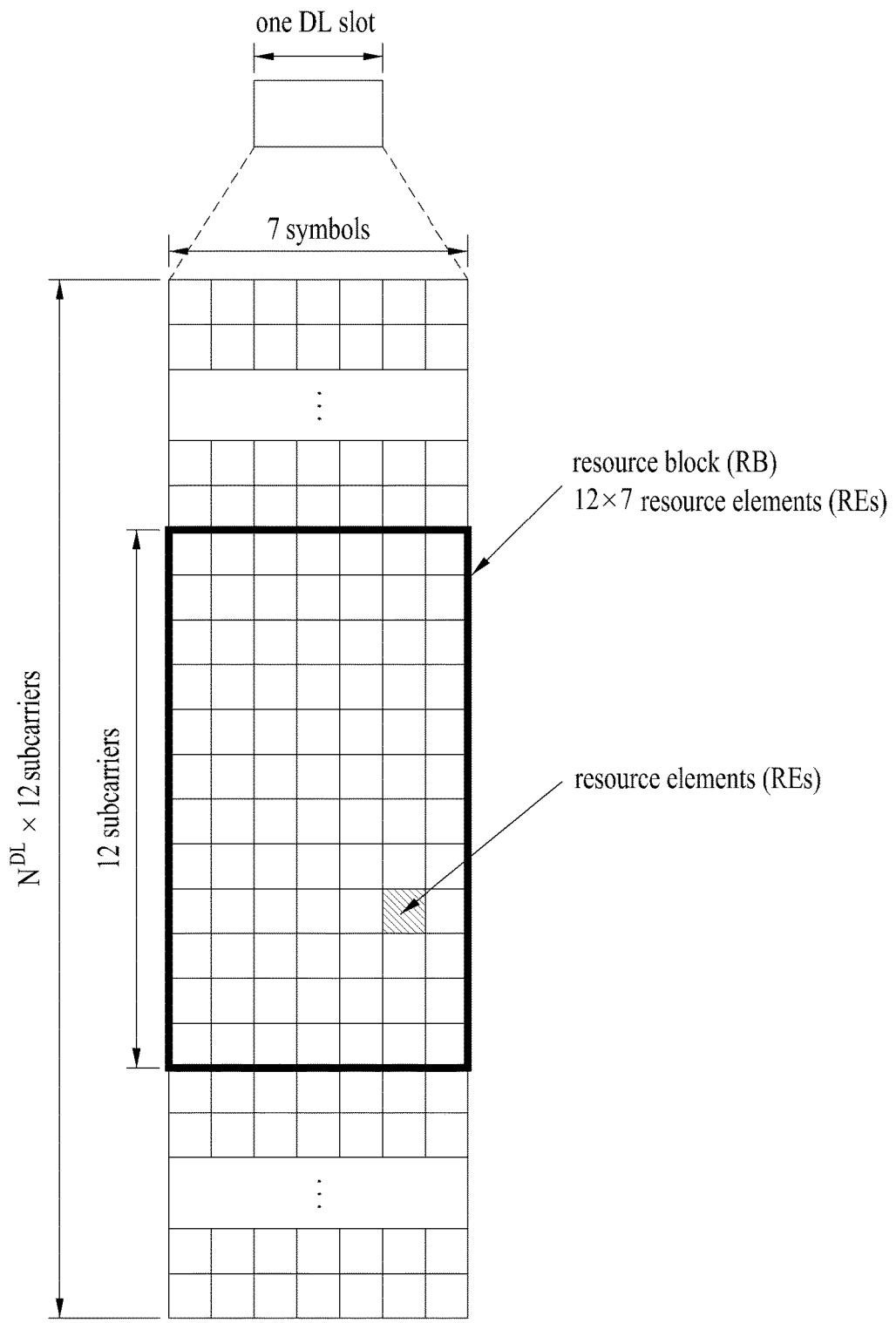
FIG. 3 exemplarily shows a resource grid of a downlink slot.

FIG. 3 is a diagram for one example of a resource grid for a downlink (DL) slot.

Referring to FIG. 3, one downlink (DL) slot may include 7 OFDM symbols and one resource block (RB) may include 12 subcarriers, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). one resource block includes 12 7 resource elements. The number NDL of resource blocks included in a DL slot may depend on a DL transmission bandwidth. And, the structure of an uplink (UL) slot may be identical to that of the DL slot.

Figure 4:
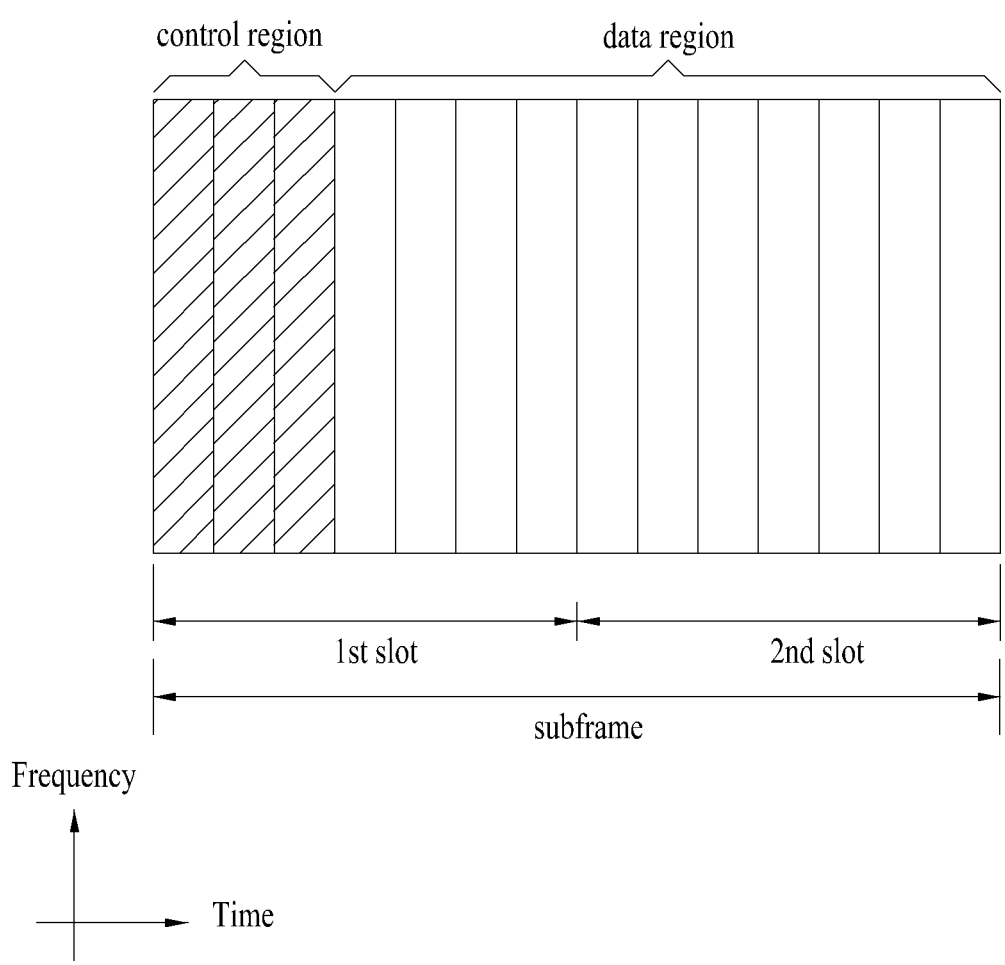
FIG. 4 exemplarily shows a downlink frame structure.

FIG. 4 is a diagram for a structure of a downlink (DL) subframe.

Referring to FIG. 4, Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission.

Control information carried on PDCCH may be called downlink control information (DCI). The DCI may include UL or DL scheduling information or a UL transmission power control command for a random UE (user equipment) group.

The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 5:
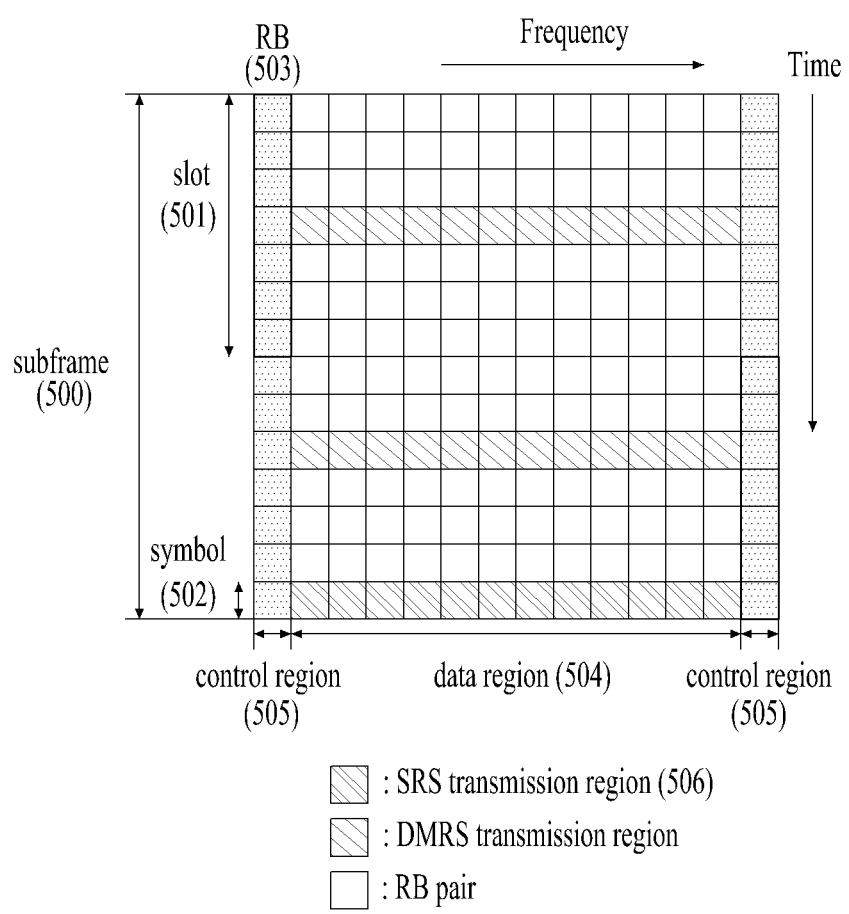
FIG. 5 exemplarily shows an uplink subframe structure.

FIG. 5 exemplarily shows an uplink subframe structure.

Referring to FIG. 5, a subframe 500 having a length of 1 ms, which is a basic unit of LTE uplink transmission, includes two 0.5 ms slots 501. Assuming a normal Cyclic Prefix (CP) length, each slot includes 7 symbols 502 and one symbol corresponds to one SC-FDMA symbol. A resource block 503 is a resource allocation unit corresponding to 12 subcarriers in a frequency domain and one slot in a time domain. The structure of the LTE uplink subframe is broadly divided into a data region 504 and a control region 505. The data region includes a PUSCH and is used to transmit a data signal such as voice. The control region includes a PUCCH and is used to transmit control information. The PUCCH includes a pair of RBs located at both ends of the data region on the frequency axis and hops between slots.

The PUCCH can be used to transmit the following control information.

Scheduling Request (SR): This is information used to request a UL-SCH resource and is transmitted using On-Off Keying (OOK).

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding MIMO includes a rank indicator (RI) and a precoding matrix indicator (PMI). 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE-A.

TABLE 1

| PUCCH format | UCI (Uplink Control Information) |
| --- | --- |
| Format 1 | SR (scheduling request) (unmodulated waveform) |
| Format 1a | 1-bit HARQ ACK/NACK (SR present/absent) |
| Format 1b | 2-bit HARQ ACK/NACK (SR present/absent) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Sounding Reference Signal (SRS) is transmitted through the last SC-FDMA symbol in one subframe in the time domain. SRSs of multiple UEs, which are transmitted through the same SC-FDMA symbol, can be identified according to frequency position/sequence.

SRS is periodically transmitted. Configuration for periodic SRS transmission is achieved by a cell-specific SRS parameter and a UE-specific SRS parameter. The cell-specific SRS parameter (in other words, cell-specific SRS configuration) and the UE-specific SRS parameter (in other words, UE-specific SRS configuration) are transmitted to a UE through higher layer (e.g. RRC) signaling. Similarly, in case of a relay system, SRS configuration for a relay is configured by a cell-specific SRS parameter and an RN-specific SRS parameter.

The cell-specific SRS parameter may include "srs-BandwidthConfig" and "srs-SubframeConfig". srs-BandwidthConfig may indicate information regarding a frequency band in which SRS can be transmitted, and srs-SubframeConfig may indicate information regarding a subframe in which SRS can be transmitted. The subframe in which SRS can be transmitted within a cell may be periodically established within a frame. Table 2 may indicate 'srs-SubframeConfig' from among cell-specific SRS parameters.

TABLE 2

| srs-SubframeConfig | Binary | Configuration Period $T_{SFC}$ (subframes) | Transmission offset $\Delta_{SFC}$ (subframes) |
| --- | --- | --- | --- |
| 0 | 0000 | 1 | {0} |
| 1 | 0001 | 2 | {0} |
| 2 | 0010 | 2 | {1} |
| 3 | 0011 | 5 | {0} |

TABLE 2-continued

| srs-SubframeConfig | Binary | Configuration Period $T_{SFC}$ (subframes) | Transmission offset $\Delta_{SFC}$ (subframes) |
|---|---|---|---|
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | Reserved |

$T_{SFC}$ is cell-specific subframe configuration, and $\Delta_{SFC}$ is a cell-specific subframe offset. srs-SubframeConfig is provided through a higher layer (e.g., RRC layer). SRS is transmitted through a subframe satisfying $\lfloor n_s/2 \rfloor$ mod $T_{SFC} \in \Delta_{SFC}$. $n_s$ is a slot index. "$\lfloor \ \rfloor$" is a flooring function, and "mod" is a modulo operation.

The UE-specific SRS parameter includes srs-Bandwidth, srs-HoppingBandwidth, freqDomainPosition, srs-ConfigIndex, transmissionComb and cyclicShift. srs-Bandwidth indicates a value used to set a frequency bandwidth in which a UE should transmit an SRS. srs-HoppingBandwidth indicates a value used to set frequency hopping of an SRS. freqDomainPosition indicates a value used to determine a frequency position where an SRS is transmitted. srs-ConfigIndex indicates a value used to set a subframe in which a UE should transmit an SRS. transmissionComb indicates a value used to set an SRS transmission Comb. cyclicShift indicates a valued used to set a cyclic shift value applied to an SRS sequence.

Tables 3 and 4 show an SRS transmission periodicity and a subframe offset according to srs-ConfigIndex. The SRS transmission periodicity indicates a time interval (unit: subframe or ms) in which a UE should periodically transmit an SRS. Table 3 shows an FDD case and Table 4 shows a TDD case. The SRS configuration index $I_{SRS}$ is signaled per UE and each UE confirms the SRS transmission periodicity $T_{SRS}$ and the SRS subframe offset $T_{offset}$ using the SRS configuration index $I_{SRS}$.

TABLE 3

| SRS Configuration Index ISRS | SRS Periodicity $T_{SRS}$ (ms) | SRS Subframe Offset $T_{offset}$ |
|---|---|---|
| 0-1 | 2 | ISRS |
| 2-6 | 5 | ISRS − 2 |
| 7-16 | 10 | ISRS − 7 |
| 17-36 | 20 | ISRS − 17 |
| 37-76 | 40 | ISRS − 37 |
| 77-156 | 80 | ISRS − 77 |
| 157-316 | 160 | ISRS − 157 |
| 317-636 | 320 | ISRS − 317 |
| 637-1023 | reserved | reserved |

TABLE 4

| Configuration Index ISRS | SRS Periodicity $T_{SRS}$ (ms) | SRS Subframe Offset $T_{offset}$ |
|---|---|---|
| 0 | 2 | 0, 1 |
| 1 | 2 | 0, 2 |

TABLE 4-continued

| Configuration Index ISRS | SRS Periodicity $T_{SRS}$ (ms) | SRS Subframe Offset $T_{offset}$ |
|---|---|---|
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | ISRS − 10 |
| 15-24 | 10 | ISRS − 15 |
| 25-44 | 20 | ISRS − 25 |
| 45-84 | 40 | ISRS − 45 |
| 85-164 | 80 | ISRS − 85 |
| 165-324 | 160 | ISRS − 165 |
| 325-644 | 320 | ISRS − 325 |
| 645-1023 | reserved | reserved |

In summary, in the existing LTE, the cell-specific SRS parameter indicates subframes occupied for SRS transmission within a cell to a UE and the UE-specific SRS parameter indicates subframes, which will actually be used by the UE, among the subframes occupied for SRS transmission. The UE periodically transmits an SRS through a specific symbol (e.g., a last symbol) of the subframe specified as the UE-specific SRS parameter.

On the other hand, in order to protect SRS transmission from subframes occupied through cell-specific SRS parameters, the UE need not transmit uplink signals through the last symbol of a subframe irrespective of actual transmission or non-transmission of SRS in the corresponding subframe.

The embodiments of the present invention have been described based on data transmission and reception between a base station (BS) and a user equipment (UE). A specific operation which has been described as being performed by the base station (BS) may be performed by an upper node of the base station (BS) as the case may be. In other words, it will be apparent that various operations performed for communication with the user equipment (UE) in the network which includes a plurality of network nodes along with the base station (BS) can be performed by the base station (BS) or network nodes other than the base station (BS). The base station (BS) may be replaced with terms such as fixed station, Node B, eNode B (eNB), and access point (AP). Also, the user equipment (UE) may be replaced with terms such as mobile station (MS) and mobile subscriber station (MSS). In addition, a reference signal (RS) may be replaced with terms such as a pilot signal, a pilot resource, a pilot sequence, etc.

MIMO System

The most important characteristic of a virtual multiple antenna system is that signals are transmitted and received through many more antennas than in legacy LTE-Advanced. As well known to those skilled in the art, transmission capacity C of a virtual multiple antenna system in which the number of antennas is set to N and the number of UEs is set to K is approximated to Signal to Noise Ratio (SNR) as represented by the following equation 1.

$$C \approx \min(N,K)\log(SNR) \qquad \text{[Equation 1]}$$

As can be seen from Equation 1, if the number (N) of antennas and the number (K) of UEs increase, a large amount of transmission capacity can be increased. However, the following two assumptions are needed for the transmission capacity of Equation 1.

Assumption 1) BS has already recognized channels among all BS antennas and all UEs. In this case, a cost needed for channel recognition is discarded.

Assumption 2) BS may use an optimum Tx/Rx method capable of obtaining maximum transmission capacity. In downlink, Dirty-Paper Code (DPC) is used. In uplink, minimum mean-square error successive interference cancellation (MMSE-SIC) is used.

As the number of antennas increases, the above-mentioned two assumptions 1 and 2 are gradually mismatched with reality. In order to perfectly recognize a channel, each UE requires an orthogonal pilot sequence, and a pilot must be transmitted with relatively high power. Therefore, transmission capacity (C) of a MIMO system is limited by allocated pilot resources. In addition, as the number of BS antennas increases, complexity for weight calculation of a Tx/Rx filter also increases, such that unexpected limitation occurs in system implementation. Although a simple linear filter (for example, maximum ratio transmission/combining (MRT/C) or zero-forcing (ZF)), it may be impossible to increase the number of antennas capable of being simultaneously used by the BS beyond a predetermined number, because of the presence of calculation complexity.

The present invention proposes an improved method for using not only a cost of a limited reference signal (RS) but also a Tx/Rx filter having low calculation complexity, and at the same time increasing capacity of the system. In accordance with the present invention, it may be possible to design a microfilter configured to use small-scale fading channel information of some UEs, instead of estimating small-scale fading channel information between each UE and antennas of all BSs participating in cooperation or coordination, and it may also be possible to design a macrofilter configured to use large-scale fading channel information. As a result, overhead of pilot resources can be reduced, and processing is classified into microprocessing for microfiltering and macroprocessing for macrofiltering, so that complexity of the overall Tx/Rx filter processing can be reduced.

Multi-Cell Cooperative Communication System (CoMP)

FIG. 6(a) is a conceptual diagram illustrating a multi-cell cooperative communication (CoMP) system.

The term "base station" as used in the present invention includes a cell or a sector. If the term "base station" has the concept of region, the term "base station" may be called a cell or a sector. A serving BS (or cell) may be regarded as a BS (or cell) for providing a main service to a UE and may transmit and receive control information on multiple coordinated transmission points. Thus, the serving BS may be referred to as an anchor BS (or anchor cell). A serving BS may transmit a variety of information received from a UE to a neighboring BS (cell). Similarly, if a neighboring BS has the concept of a region, the neighboring BS may be called a neighboring cell. In the present invention, one CoMP set refers to a set of cells which can perform the CoMP operation.

If the CoMP scheme is used in a multi-cell environment, communication performance of a UE located at a cell boundary can be improved. Such a CoMP scheme includes a coordinated MIMO joint processing (JP) scheme through data sharing, a coordinated scheduling/beamforming (CS/CB) scheme for reducing inter-cell interference, such as worst companion or best companion, and a transmission process (e.g., multi-antenna) scheme of geographically separate points.

From among these, in particular, the coordinated CS/CB scheme is a method of reducing inter-cell interference (ICI), which can reduce interference from a neighboring cell by transmitting a limited and/or recommended PMI from a UE to a serving BS. Here, a worst companion scheme refers to a method of reporting, to a serving BS, a PMI having highest interference with respect to cells which perform the CoMP operation and eliminating inter-cell interference using the second best excluding the PMI. The best companion scheme refers to a method of reporting a PMI having lowest interference with respect to cells which perform the CoMP operation and reducing inter-cell interference (ICI) by utilizing the PMI at neighboring cells.

A MIMO scheme includes a single user-MIMO (SU-MIMO) scheme of allocating all antenna resources of a BS to one UE and a multiple user-MIMO (MU-MIMO) for distributing antenna resources or radio space resources to a plurality of UEs. UEs need to be aware of which reference signals are transmitted by BSs configured to perform CoMP MU-MIMO. That is, UEs may perform accurate channel estimation based on such reference signals.

A scheme for transmitting a desirable signal from multiple cells which perform the CoMP operation to a UE located at a cell boundary using the same resource domain (time/frequency domain) is referred to as a coherent or RF combining scheme. For such an RF combining scheme, an inter-cell MIMO scheme through inter-cell coordination is applicable. Such a MIMO scheme includes a transmission diversity (TxD) scheme, such as a single frequency network (SFN) transmission scheme for transmitting the same data between cells or a space time block code (SFBC) scheme, or a spatial multiplexing (SM) scheme of a higher layer.

A plurality of BSs constructing a multi-cell cooperative communication system may include not only BSs controlling general cells, such as a macro cell, a micro cell, and a femto cell, but also a relay node. Therefore, a multi-cell cooperative communication system according to the embodiment can be applied to various cooperative communication schemes, for example, cooperative communication based on general cells, cooperative communication of relay nodes, cooperative communication of general cells and relay nodes, etc.

Referring to FIG. 6(a), in multi-cell cooperative communication (Coordinated Multi Point: CoMP), a plurality of contiguous BSs (A to E of FIG. 6a) may be coupled to a central processor through a backhaul. Coordinated BSs may have different antennas. For convenience of description, it is assumed that each BS has the same number M (M=1, 2, . . . ) of antennas. The number of cooperative BSs (coordinated BSs) may be decided by a backhaul connection/disconnection state and a network environment, where L (L=1, 2, . . . ). K UEs to be communicated may be distributed in a cell, and individual UEs may have different numbers of antennas. For convenience of description, it is assumed that all UEs have a single antenna. The UE having multiple antennas may consider that individual antennas are different from each other. A downlink channel between the L-th Radio Unit (RU) port (i.e., the L-th BS port) and the K-th UE is represented by the following equation 2.

$$g_{lk} = \sqrt{\beta_{lk}} h_{lk} \quad \text{[Equation 2]}$$

In Equation 2, $\beta_{lk}$ is average signal power between the L-th RU port and the K-th UE, and $h_{lk}$ is a vector channel having a dispersion of 1. The average signal power is determined not only by path attenuation caused by a distance between the port and the UE, but also by shadowing, so that the average signal power remains unchanged for a long period of time. However, $h_{jk}$ is affected by signal attenuation or supplementary interference, and remains unchanged for a short period of time.

The cooperative communication system may be classified according to the position of a signal processor. A distributed antenna system transmits inter-BS information through a backhaul, transmits/receives data using a processor of each BS, and transmits BS information to a central processor through a backhaul, so that the resultant information can be collectively processed by the central processor. The backhaul network may be any of a first network having higher transmission capacity as compared to the RF channel, and a second network having limited transmission capacity. In the case of the first network, signals can be communicated between BSs without loss. In the case of the second network, transmission loss may occur in a backhaul network.

FIG. 6(b) is a conceptual diagram illustrating another example of the multi-cell cooperative communication (CoMP) system.

Referring to FIG. 6(b), a plurality of BSs may be distributed. As can be seen from FIG. 6(a), information of BSs may be shared through a backhaul. In the present invention, for cooperation of the BSs, for example, if BS A (Cell A) transmits and receives signals to and from a UE located in the Cell A, a plurality of BSs (i.e., BSs B~I or Cells B~I) adjacent to BS A (Cell A) (or enclosing the BS A (Cell A)) may be regarded as coordinated BSs. From another standpoint, on the basis of BS C (Cell C), BS D (Cell D), BS A (Cell A), and BS B (Cell B) may be regarded as coordinated BSs. In this case, BS B (Cell B) may be regarded as a coordinated BS of two BSs (BS A and BS C). Differently from the present invention, the conventional coordinated transmission considers different coordinated BS groups. In accordance with the present invention, information regarding interference cancellation is shared between coordinated BSs, such that signals having low inter-cell interference (ICI) can be communicated between the coordinated BSs. For convenience of description and better understanding of the present invention, BSs can be distributed in the form of a lattice as an example, and the BSs can be distributed in various shapes.

Figure 7:
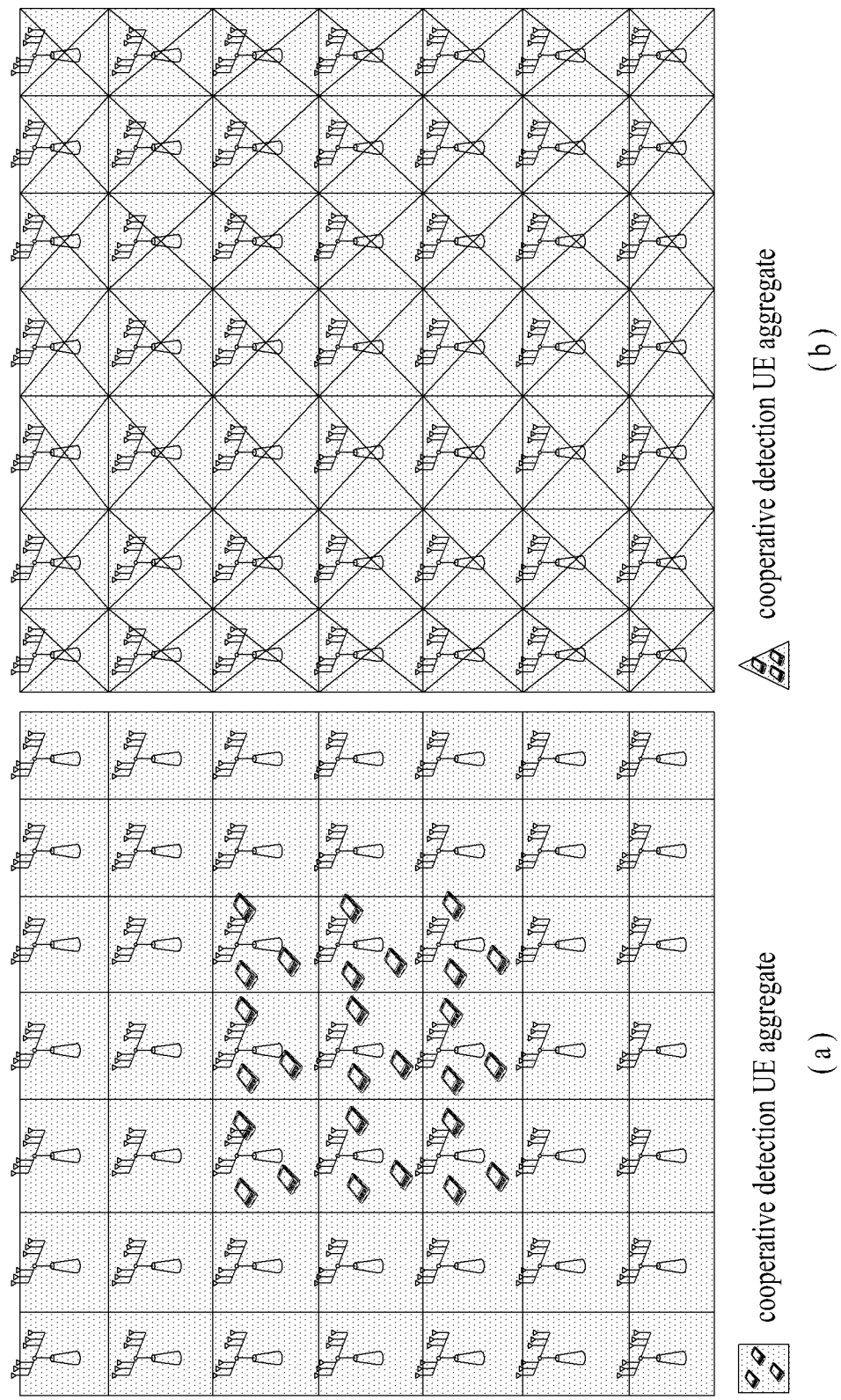
FIG. 7 is a conceptual diagram illustrating a cooperative detection UE set for inter-cell cooperative communication.

FIG. 7 is a conceptual diagram illustrating a cooperative detection UE set for inter-cell cooperative communication.

Referring to FIG. 7(a), one BS may have one cell. One cell may include a plurality of UEs. All BSs participating in coordination or cooperation may construct a coordinated detection UE set by detecting an inter-cell UE from their unique cell regions.

Referring to FIG. 7(b), each cell can be divided into sub-cells, and a cooperative detection UE set may be determined on the basis of the sub-cells. Therefore, UEs located in the same sub-cell may be used as the same cooperative detection UE set.

Figure 8:
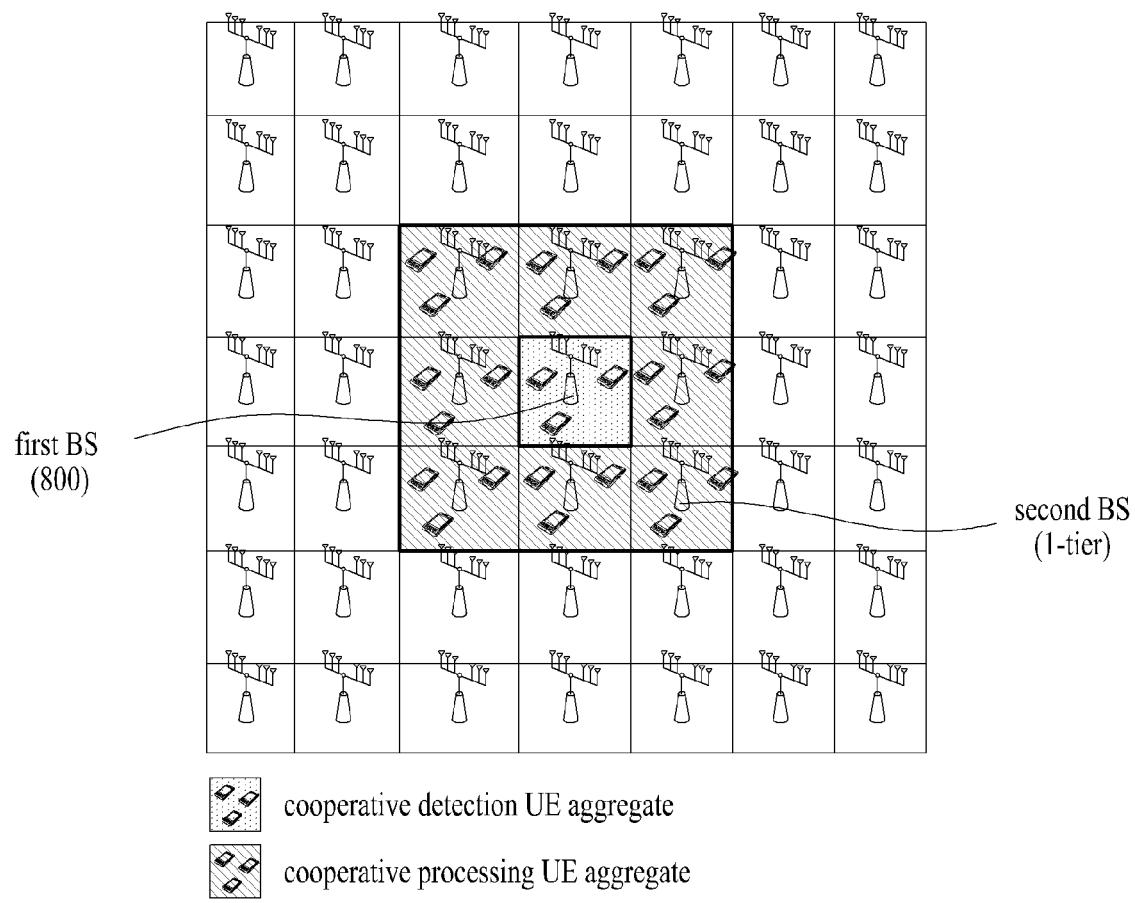
FIG. 8 is a conceptual diagram illustrating a cooperative processing UE set according to an embodiment of the present invention.

FIG. 8 is a conceptual diagram illustrating a cooperative processing UE set according to an embodiment of the present invention.

Referring to FIG. 8, a first BS 800 corresponding to one of a plurality of BSs may be arranged along with neighbor BSs. The neighbor BSs enclosing the first BS 800 may be referred to as a 1-tier BS (i.e., a second BS). The first BS 800 may detect a UE located in the cell (i.e., an inter-cell UE), and UEs detected from the first BS 800 may be configured as a single cooperative detection UE set. In other words, UEs detected from the first BS may be used as a cooperative detection UE set. The cooperative processing UE set may include not only a cooperative detection UE set, but also UEs detected from each 1-tier BS. As described above, assuming that the cell of the first BS is comprised of sub-cells, a cooperative detection UE set may be constructed on the basis of each sub-cell.

In the same manner as in the first BS, each BS may detect an inter-cell BS from its own unique cell. Therefore, a cooperative detection UE set may be configured for each BS. In this case, from the viewpoint of the first BS, the first BS may share cooperative detection UE set information of the 1-tier BS, so that a cooperative processing UE set of the first BS can be constructed.

Figure 9:
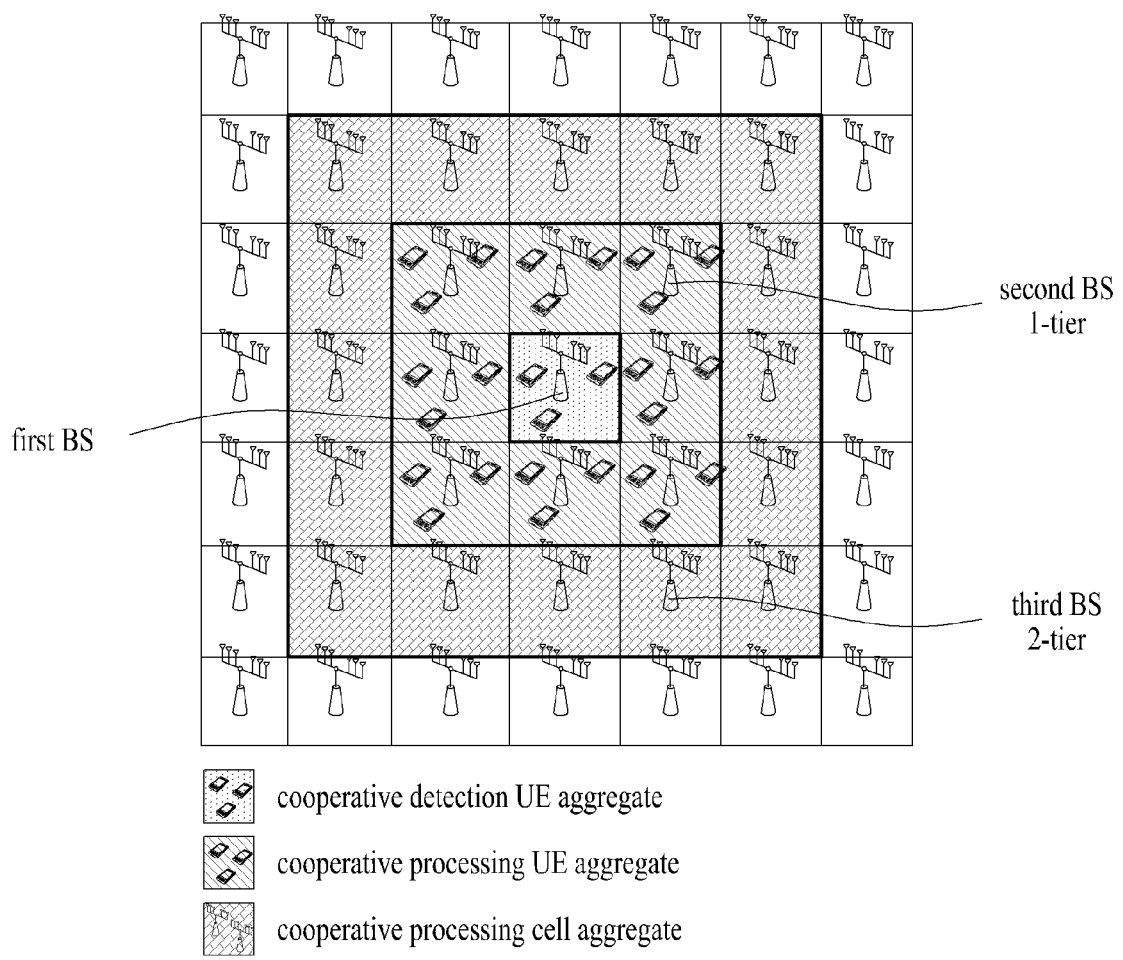
FIG. 9 is a conceptual diagram illustrating a cooperative processing cell set according to an embodiment of the present invention.

FIG. 9 is a conceptual diagram illustrating a cooperative processing cell set according to an embodiment of the present invention.

Referring to FIG. 9, the first BS may have the cooperative detection UE set information corresponding to a set or set of UEs detected from a unique cell of the first BS, and the 1-tier BSs acting as the cooperative BSs may have cooperative processing UE set information obtained by sharing information of UEs detected from their own cells. In addition, the first BS may construct a cooperative processing cell set corresponding to an set (or set) of 2-tier BSs (third BSs) each having information regarding UEs contained in the 1-tier BS.

Figures 10, 11:
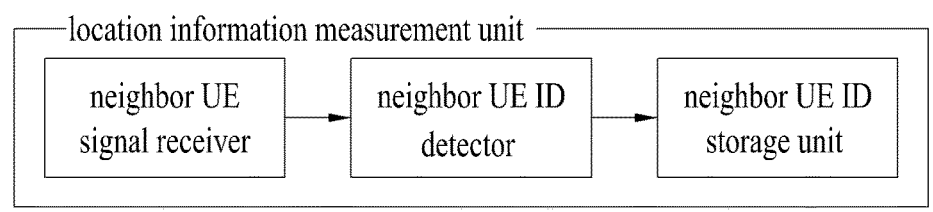
FIG. 10 is a conceptual diagram illustrating a cooperative processing UE set and a cooperative processing cell set according to another embodiment of the present invention.
FIG. 11 is a conceptual diagram illustrating a method for measuring UE location information according to an embodiment of the present invention.

FIG. 10 is a conceptual diagram illustrating a cooperative processing UE set and a cooperative processing cell set according to another embodiment of the present invention.

Referring to FIG. 10, for convenience of description and better understanding of the present invention, different numbers are allocated to respective BSs and respective UEs according to the lattice-shaped BS distribution. It is assumed that three UEs are located in each BS cell, and the number of UEs contained in the BS cell may be changeable, and a cell having no UE may also exist. In BS Cell #1, UE #1-1, UE #1-2, and UE #1-3 may be present. The three UEs (#1-1 to #1-3) may be used as a cooperative detection UE set of the first BS. In addition, the second BSs, each of which acts as the 1-tier BS, on the basis of the BS #1, may range from BS #2 to BS #9 (the numbering orders may be changeable as necessary). In BS Cell #2, UE #2-1, UE #2-2, and UE #2-3 may exist. In this case, an set (or set) of a plurality of UEs (i.e., cooperative detection UE set (#1-1, #1-2, #1-3) and UEs (#2-1, #2-2, #9-2, and #9-3: a total of 27 UEs) may be regarded as a cooperative processing UE set. The third BSs acting as the 2-tier BSs on the basis of the BS #1 may range from BS #10 to BS #25, and a total of 25 BSs ranging from BS #1 to BS #25 may be regarded as one cooperative processing cell set.

The above-mentioned description has disclosed, assuming that the BS #1 is used as a reference BS, a cooperative detection UE set, a cooperative processing UE set, and a cooperative processing cell set with respect to communication (signal transmission and reception) between BS #1 and an inter-cell UE of c the BS #1. Therefore, in another example, the BS #2 may also be used as a reference BS as necessary. If BS #2 communicates with UEs (#2-1, #2-2, #2-3) contained in the BS #2, the UEs (#2-1, #2-2, #2-3) may be used as a cooperative detection UE set. In addition, on the basis of the BS #2, the 1-tier BSs may be a total of 8 BSs (#10, #11, #12, #3, #1, #9, #24, #25). The cooperative processing UE set may include not only cooperative detection UE set (#2-1, #2-2, #2-3) but also UEs contained in the 1-tier BS cell. In FIG. 10, the 2-tier BSs may be BSs (#13, #4, #5, #6, #7, #8, #23, etc.). That is, during communication between the BS and the UE, the 1-tier and 2-tier concepts are relative concepts. Each BS may have a unique cooperative detection UE set, a cooperative processing UE set, and a cooperative processing cell set.

As described above, the reason why the cooperative detection UE set, the cooperative processing UE set, and the cooperative processing cell set on the basis of one BS is as follows. First of all, the BS may acquire BS and UE information of a neighbor cell so as to remove the inter-cell interference (ICI) signal. Through information of the neighbor cell, the interference signal associated with signal communication with the inter-cell UE can be removed. In this case, the BS has already recognized the basic reference information capable of removing the interference signal using only the 1-tier neighbor cell information, so that the BS can remove the interference signal. The present invention aims to acquire a high-accuracy desirable signal, instead of removing the interference signal. Therefore, on the basis of only one BS, information regarding the 2-tier BSs each having information regarding the cooperative processing UE is exchanged or shared, so that the interference signal of the 1-tier UE can be more accurately removed or cancelled. Therefore, according to the present invention, due to the above-mentioned reason, information regarding at least 2-tier BSs is exchanged or shared, so that the interference signal can be more accurately removed.

A method for deciding the cooperative processing UE set and the cooperative processing cell set using the CoMP scheme when the BS #1 communicates with UEs (#1-1, #1-2, #1-3) corresponding to the cooperative detection UE set according to the embodiment of the present invention will hereinafter be described in detail.

FIG. 11 is a conceptual diagram illustrating a method for measuring UE location information according to an embodiment of the present invention.

Referring to FIG. 11, UEs can be classified into active UEs capable of communicating with the BS and inactive UEs incapable of communicating with the BS. The inactive UEs can be classified into a measurement UE and an idle UE. The inactive UEs may periodically be location measurement UEs, or may be location measurement UEs upon receiving a BS request or a UE decision signal. The location measurement UE may measure which UE is adjacent to the location measurement UE using a location information measurement unit from among processors of each UE, and may then switch to the idle UE. The location information measurement unit from among the processors of each UE may include a neighbor UE signal receiver, a neighbor UE identification (ID) detector, and a neighbor UE ID storage unit. The neighbor UE signal receiver may receive a reference signal transmitted from the neighbor active UE on uplink. The neighbor UE ID detector may search for an ID of a neighbor UE using the received reference signals and correlation between the received reference signals. For example, assuming that each received reference signal is denoted by 'r' and the reference signals are denoted by $\{\phi_i\}_i$, correlation of the i-th reference signal is denoted by $C_i = \phi_i^H r$. Assuming that a given detection threshold is denoted by 'T', if $C_i > T$ is given, this means that the UE having used the i-th reference signal is a neighbor UE. The neighbor UE ID storage unit may store IDs of the detected neighbor UEs in the location information storage unit of the UE storage unit. For example, as can be seen from FIG. 10, UE #1-1 contained in BS Cell #1 may detect neighbor UEs #1-2 and #1-3. In this case, each UE may have a unique ID and may obtain IDs of UEs #1-2 and #1-3, so that each UE can recognize that the UEs (#1-2, #1-3) are used as neighbor UEs.

Figure 12:
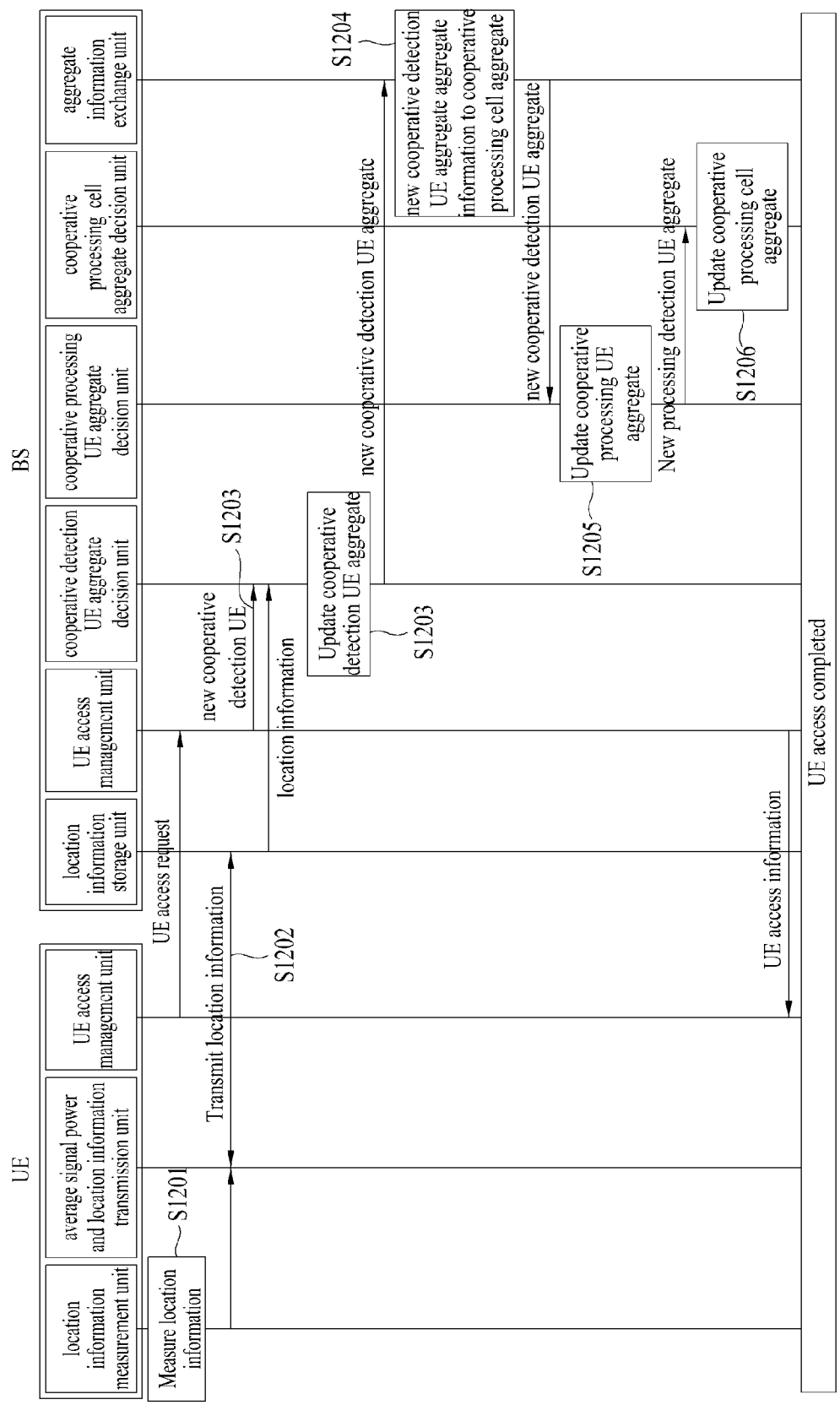
FIG. 12 is a block diagram illustrating UE and BS functions for UE access according to an embodiment of the present invention.

FIG. 12 is a block diagram illustrating UE and BS functions for UE access according to an embodiment of the present invention.

Referring to FIG. 12, one part processed by the UE and the other part processed by the BS are spaced apart from each other, and a series of processes for allowing the BS to access the UE are shown in FIG. 12. As can be seen from FIG. 11, the UE may measure location information using the location information measurement unit in step S1201. For example, the UE #1-1 may store specific information indicating that UEs (#1-2 and #1-3) are adjacent to the UE #1-1 as location information through location measurement. If the UE transmits its own location information to the BS in step S1202, the BS may store the received UE location information in the location information storage unit. The BS may construct the cooperative detection UE set through information received from the UE and/or through the detected UE location information in step S1203. Referring to FIG. 10, the BS #1 may receive location information from UEs (#1-1, #1-2, #1-3), and may recognize which UE was located in the UE cell on the basis of such location information.

As described above, each BE may construct the cooperative detection UE set. The BS may share the cooperative detection UE set information with the peripheral neighbor BSs through a backhaul in step S1204. The BS having shared UE information within the cell may construct the cooperative processing UE set information through location information of UEs located in the 1-tier BS cell starting from the 1-tier BS (i.e., peripheral BSs of the BS) in step S1205. In addition, the BS may update the legacy cooperative processing UE set information by repeating the above-mentioned process. The BS having constructed the cooperative processing UE set information may acquire the 2-tier BS information from the cooperative processing UE. Alternatively, the BS may also acquire the 2-tier BS information by exchanging or sharing information between several BSs. Through acquisition of the 2-tier BS information, the BS may construct the cooperative processing cell set information in step S1206. In addition, through repetition of the above-mentioned steps (S1201 to S1206), the legacy cooperative detection UE set information, the cooperative processing UE set information, and the cooperative processing cell set information can be updated.

The BS, which has the cooperative detection UE set information and the cooperative processing UE set information, can reduce inter-cell interference (ICI) using only its own information. However, the BS according to the present invention may use the 2-tier BS information so as to more accurately perform the inter-cell interference (ICI). A detailed description thereof is as follows. Referring to FIG. 10, the BS #1 may construct the cooperative detection UE set {UEs #1-1, #1-2, #1-3}, and may share information with BS #2 and BS #9 acting as the 1-tier BSs through a backhaul, such that the BS #1 may construct the cooperative processing UE set {UEs #1-1, #1-2, #1-3, #2-1, #9-2, #9-3}. In this case, information of the UE #2-1 may be stored in the BS #10. The BS #10 may share its own cooperative detection UE set information with neighbor BSs (peripheral BSs) (specifically, BS #2), and the UE #2-1 may be contained in the cooperative processing UE set of the BS #10. Therefore, in order to correctly remove the interference signal of the UE #2-1 regarding the BS #1, it may be necessary for the BS #1 to recognize information regarding the BS #10. Although the present invention has disclosed that information regarding at least 2-tier BS can be acquired or shared for convenience of description and better understanding of the present invention, the present invention may include a process for acquiring or sharing information regarding at least 3-tier BS.

Figure 13:
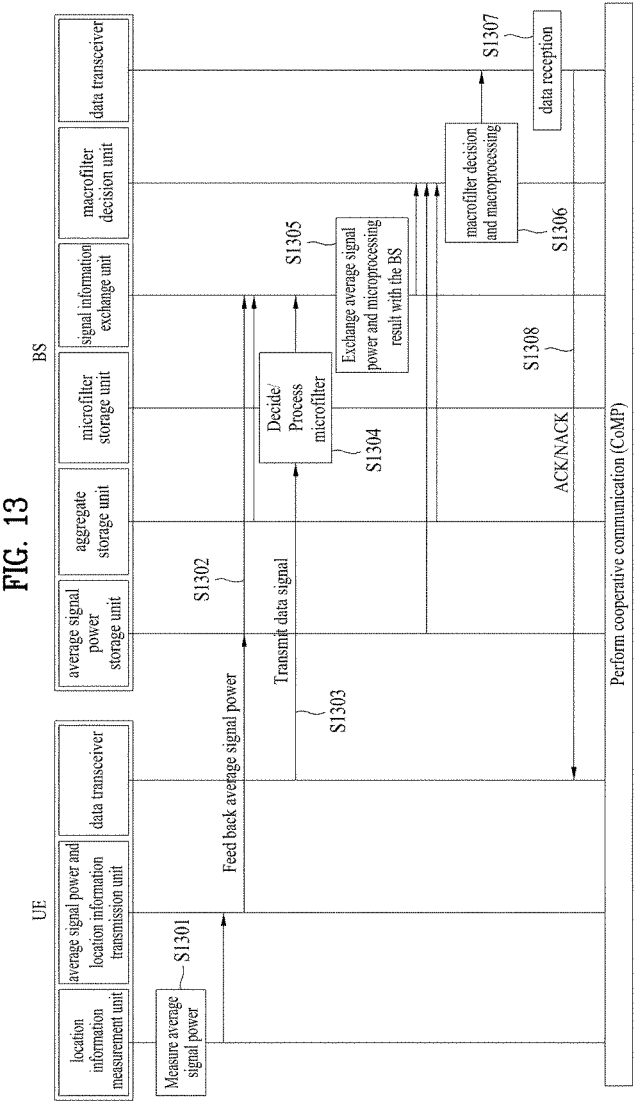
FIG. 13 is a block diagram illustrating UE and BS functions for inter-cell cooperative communication according to an embodiment of the present invention.

FIG. 13 is a block diagram illustrating UE and BS functions for inter-cell cooperative communication according to an embodiment of the present invention.

Referring to FIG. 13, the UE may measure its own location information, and may also measure signal power of the BS in step S1301. The average signal power measurement unit of the UE may measure signal power of the neighbor BS, and may periodically or aperiodically feed back the measurement result to the BS through the average signal power and location information transmission unit in step S1302. The UE may also feed back the above information upon receiving a BS request. The neighbor BSs may exchange the average signal power information fed back from the UE or the average signal power information measured by the BS with each other through a backhaul. The exchanged information may be stored in the average signal power storage unit from among BS memories. The UE may transmit a data signal to the BS through a data transceiver of the UE.

The BS having received the UE data signal from the UE may perform a process for removing the interference signal contained in the UE data signal. The microfilter decision unit of the BS may generate a microfilter using small-scale fading channel information between the BS and the UE, and may perform signal filtering using the microfilter in step S1304. The microprocessed signal may be exchanged or shared with the cooperative BS through the signal information exchange unit of the BS in step S1305. The macrofilter decision unit of the BS may generate the macrofilter using the large-scale fading information, and may perform macrofiltering processing of the signal received through the signal information exchange unit using the macrofilter in step S1306. The data transceiver of the BS may detect a UE desirable signal on the basis of the macroprocessed result, and may inform the UE of specific information indicating the success or failure of transmission through ACK/NACK transmission in step S1308.

A method (i.e., a filtering method) for allowing the BS to reduce the inter-cell interference (ICI) signal will hereinafter be described in detail.

Figure 14:
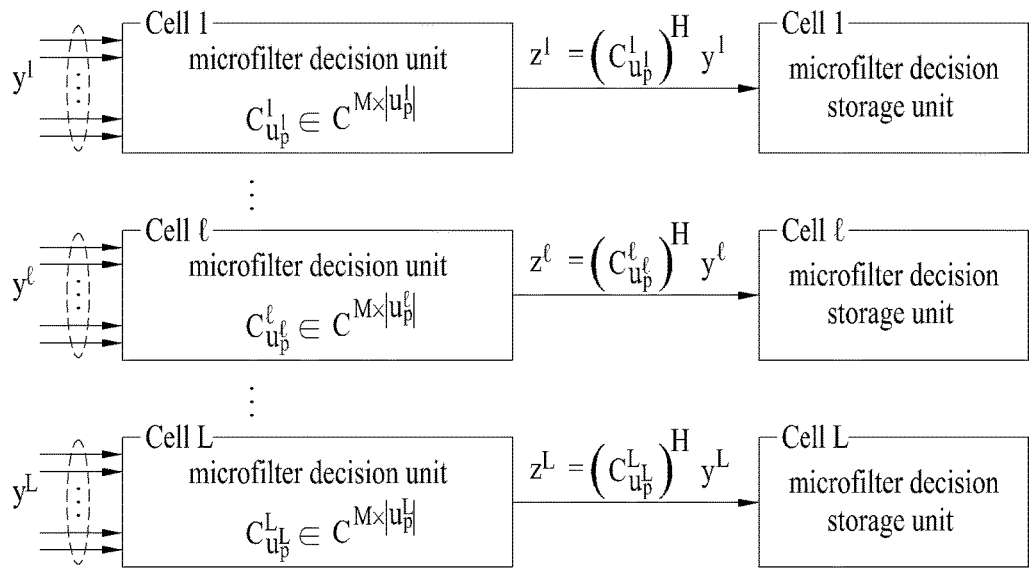
FIG. 14 is a block diagram illustrating a microfiltering process according to an embodiment of the present invention.

FIG. 14 is a block diagram illustrating a microfiltering process according to an embodiment of the present invention.

Referring to FIG. 14, the BS for each cell may construct the cooperative detection UE set, and a UE detection process for each BS may be regarded as some parts of the microprocessing. Assuming that the cooperative detection UE set generated from the l-th cell is denoted by $u_D^l$, the cooperative processing UE set is denoted by $u_P^l$, and the cooperative processing cell set is denoted by $C_P^l$, a baseband signal received from M antennas of the BS of the l-th cell may be represented by the following equation 3.

$$y^l = g_{lk} s_k + \sum_{j \neq k} g_{lj} s_j + n_l = \sqrt{\beta_{lk}} h_{lk} s_k + \sum_{j \neq k} \sqrt{\beta_{lj}} h_{lj} s_j + n_l \quad \text{[Equation 3]}$$

In Equation 3, $g_{lj}$ indicating the (M×1) vector may denote a channel between the k-th UE and the BS antenna of the l-th cell, and $\beta_{lj}$ may denote large-scale fading channel information between the k-th UE and the l-th cell BS. $h_{lj}$ indicating the (M×1) vector may denote small-scale fading channel information between the k-th UE and the BS antenna of the l-th cell, and $n_l$ indicating the (M×1) vector may denote noise of the BS of the l-th cell. The microfilter for the k-th UE in the l-th cell BS is denoted by $c_k^l \in \mathbb{C}^{M \times 1}$, and the microfilter may be configured using the small-scale channel information. For example, assuming that the microfilter for the k-th UE in the l-th cell BS is configured using the maximum ratio combining (MRC) scheme, the microfilter $c_k^l$ may be represented by the following equation 4.

$$c_k^l = \frac{h_{lk}}{\|h_{lk}\|} \quad \text{[Equation 4]}$$

The microfilter $c_k^l$ may be regarded as one of the embodiments, and the scope or spirit of the microfilter $c_k^l$ is not limited thereto. Generally, the microfilter $c_k^l$ may be implemented by the following equation 5.

$$c_k^l = f(\{h_{lj}\}_j) \quad \text{[Equation 5]}$$

In Equation 5, $f(\cdot)$ is an arbitrary function defined in the M-dimensional space. The l-th BS must generate the microfilter for all UEs contained in the cooperative processing UE set. Assuming that $(U_P^l(j)$ is regarded as the j-th element of the cooperative processing UE set, the microfilter for all UEs contained in the cooperative processing UE set can be represented by the following equation 6.

$$C_{u_P^l}^l = \begin{bmatrix} c_{u_P^l(1)}^l & c_{u_P^l(2)}^l & \cdots & c_{u_P^l(|u_P^l|)}^l \end{bmatrix} \quad \text{[Equation 6]}$$

The microfilter result storage unit of all cells may allow the reception signal shown in Equation 3 to pass through the microfilter of Equation 5, such that it may store the output result. The signal $z^l$ being microprocessed by the l-th cell BS may be represented by the following equation 7.

$$z^l = \left(C_{u_P^l}^l\right)^H y^l \quad \text{[Equation 7]}$$

Figure 15:
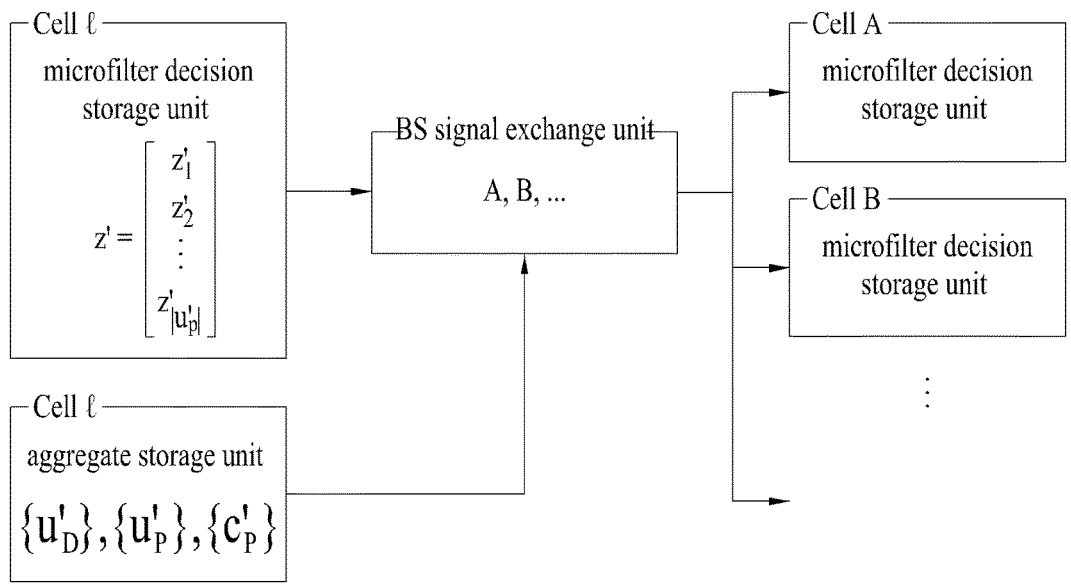
FIG. 15 is a block diagram illustrating a signal information exchange process according to an embodiment of the present invention.

FIG. 15 is a block diagram illustrating a signal information exchange process according to an embodiment of the present invention.

Referring to FIG. 15, the signal information exchange unit of the BS of each cell may transmit the signal $z^l$ stored in the microfilter result storage unit to other cells (A, B, . . . ). For example, the BS of the l-th cell may obtain the microfiltering result information from the BSs of the cells contained in the cooperative processing cell set $c_P^l$ so as to detect signals of UEs contained in the cooperative detection UE set $u_D^l$, of the BS of the l-th cell. Assuming that $c_P^l(j)$ is denoted by the j-th element of the cooperative processing cell set $c_P^l$, the signals received from the l-th cell BS are denoted by the following expression.

$$z^{C_P^l(1)}, z^{C_P^l(2)}, \ldots, z^{C_P^l(|C_P^l|)}. \quad \text{[Expression]}$$

Figure 16:
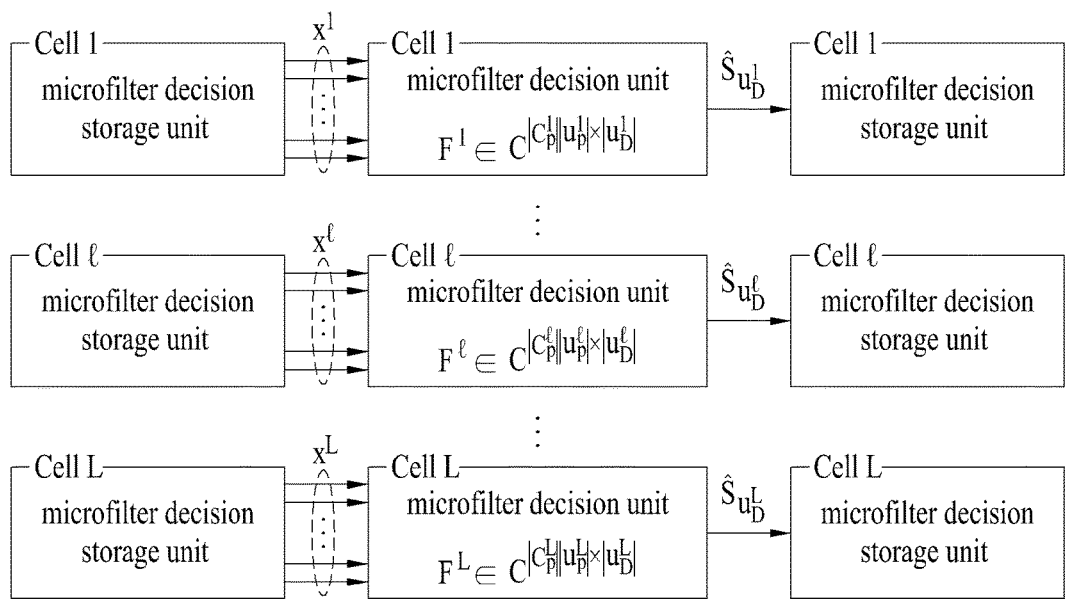
FIG. 16 is a block diagram illustrating a macrofiltering process according to an embodiment of the present invention.

FIG. 16 is a block diagram illustrating a macrofiltering process according to an embodiment of the present invention.

Referring to FIG. 16, through the above-mentioned microfiltering result, it may be possible to design a macrofilter. The microfilter result storage unit of the l-th cell BS may have information represented by the following equation 8.

$$x^l = vec\left(z^{C_p^l(1)}, z^{C_p^l(2)}, \ldots, z^{C_p^l(|C_p^l|)}\right) \quad [\text{Equation 8}]$$

In Equation 8, vec(·) may interconnect a plurality of vectors in the form of column vectors. For convenience of description, the following equation $C_p^l(j)=j$, $|C_p^l|=C$ is assumed. Information stored in the microfilter result storage unit can be represented by the following equation 9.

$$x^l = vec(z^1, z^2, \ldots, z^C) \quad [\text{Equation 9}]$$
$$= C^H\left(H_k d_k s_k + \sum_{j \neq k} H_j d_j s_j + n\right)$$

In Equation 9, C and $H_j$ are as follows.

$$C = \begin{bmatrix} C_{u_p^1}^1 & 0 & \cdots & 0 \\ 0 & C_{u_p^2}^2 & & \vdots \\ \vdots & & \ddots & 0 \\ 0 & \cdots & 0 & C_{u_p^C}^C \end{bmatrix}, H_j = \begin{bmatrix} h_{1j} & 0 & \cdots & 0 \\ 0 & h_{2j} & & \vdots \\ \vdots & & \ddots & 0 \\ 0 & \cdots & 0 & h_{Cj} \end{bmatrix},$$

$$d_j = \begin{bmatrix} \sqrt{\beta_{1j}} \\ \sqrt{\beta_{2j}} \\ \vdots \\ \sqrt{\beta_{Cj}} \end{bmatrix}, \text{ and } n = \begin{bmatrix} n_1 \\ n_2 \\ \vdots \\ n_C \end{bmatrix}$$

The macroprocessing may be generated using the large-scale fading information $\{\beta_{lk}\}_{l,k}$. For example, assuming that an exemplary macrofilter is designed using the MRC, a macrofilter $f_k^l$ for the k-th UE in the l-th cell BS can be represented by the following equation 10.

$$f_l^k = \frac{d_k}{\|d_k\|} \quad [\text{Equation 10}]$$

The scope or spirit of the present invention is not limited to the above-mentioned embodiment, and a general macrofilter can be implemented by the following equation 11.

$$f_l^k = f(\{d_k\}_k) \quad [\text{Equation 11}]$$

In Equation 11, f(·) is an arbitrary function defined in the C-dimensional space. The l-th BS must generate the macrofilter for all UEs contained in the cooperative detection UE set. Assuming that $u_D^l(j)$ is the j-th element of the cooperative detection UE set of the l-th BS, the microfilter for all UEs contained in the cooperative processing UE set can be represented by the following equation 12.

$$F_{u_D^l}^l = \begin{bmatrix} f_{u_D^l(1)}^l & f_{u_D^l(2)}^l & \cdots & f_{u_D^l(|u_D^l|)}^l \end{bmatrix} \quad [\text{Equation 12}]$$

The macrofilter result storage unit of all cells may allow the reception signal of Equation 8 to pass through the macrofilter of Equation 12, and may store the macrofiltering result. The signal being macroprocessed by the l-th cell BS may be represented by the following equation 13.

$$\hat{s}_{u_D^l} = \left(F_{u_D^l}^l\right)^H x^l \quad [\text{Equation 13}]$$

Figure 17:
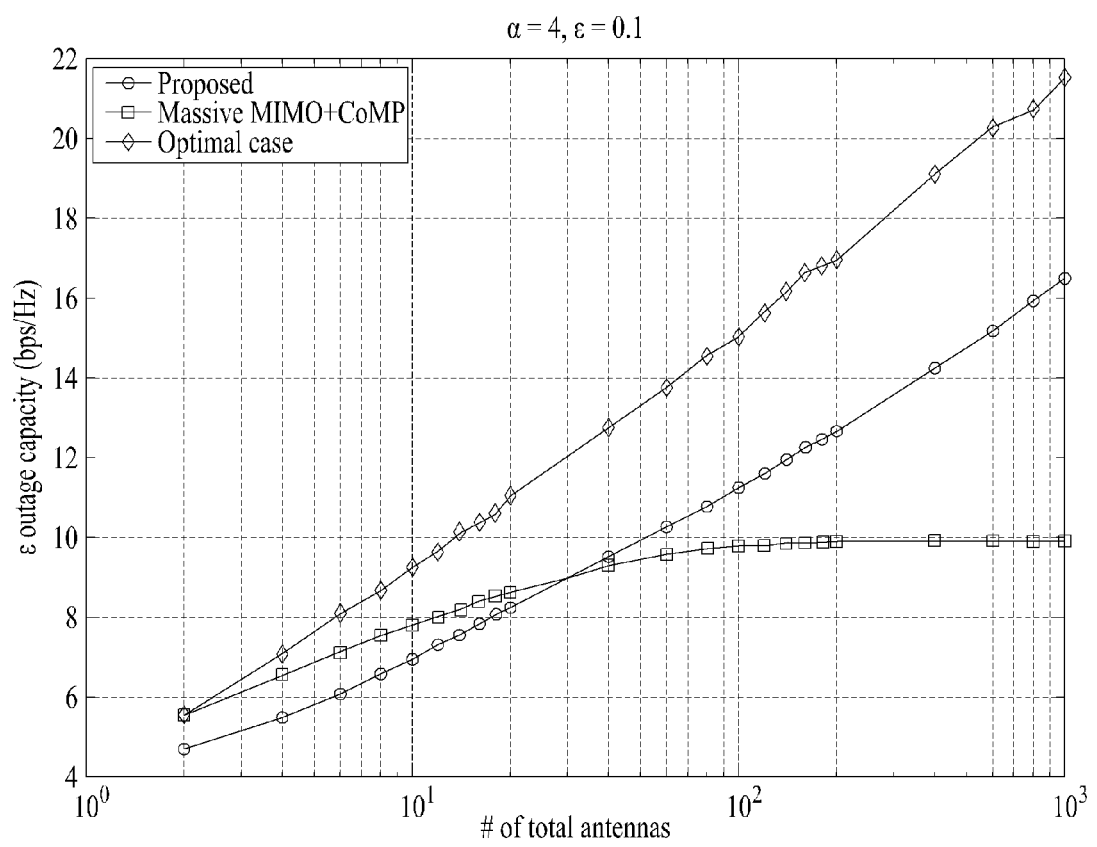
FIG. 17 is a graph illustrating performance according to an embodiment of the present invention.

FIG. 17 is a graph illustrating performance according to an embodiment of the present invention.

Referring to FIG. 17, the simulation environment for performance comparison may configure a specific environment in which two cells are present and only one cell is assigned to each cell. The UE location distribution may be uniform within the cell, and the performance metric may indicate a maximum transfer rate indicating the outage capacity capable of satisfying the outage probability within the range of 10%. The target objects (1) (2), and (3) to be compared with each other are as follows.

1) Optimal Method

Assuming that channel information has already been completely recognized without cost, all BSs may cooperatively perform ZF (zero-forcing)

2) (Massive MIMO+CoMP) Method

Channel information is acquired using a given reference signal, and all BSs may cooperatively perform ZF 3) Proposed Method Channel information is acquired using a given reference signal, and the proposed microprocessing/macroprocessing methods are carried out.

The above-mentioned simulation has assumed that the reference signals needed when channel information is acquired from two cells are identical to each other. Referring to FIG. 17, since the second comparison target (Massive MIMO+CoMP) uses the same reference signals, the outage capacity gradually increases according to the increasing number of antennas due to the occurrence of pilot contamination, and then stops increasing at the limit of about 100 antennas. However, according to the proposed method, the number of antennas increases although the same reference signals are used, so that the outage capacity also unavoidably increases. In accordance with the proposed method, assuming that 30 or more antennas than the number of antennas for use in the conventional art are used, the proposed method can obtain a higher performance gain. Assuming that about 100 antennas are used, the performance gain of about 18% can be obtained, and assuming that about 200 antennas are used, the performance of about 25% can be obtained, as can be seen from FIG. 17.

FIG. 18 is a block diagram illustrating UE and BS functions according to an embodiment of the present invention.

FIG. 18(a) is a block diagram illustrating various functions of a UE processor and a UE memory. Referring to FIG. 18(a), the UE processor may include a UE access management unit, a location information measurement unit, an average signal power measurement unit, an average signal power and location information transmission unit, and a data transceiver. The UE access management unit may allow the UE to transmit a UE access request to a neighbor BS. The location information measurement unit may measure relative positions between the UE and the BS. The average signal power measurement unit may allow the UE to accumulate the average signal power received from the neighbor cell BS (including its own cell), and may measure the accumulated average signal power. The average signal power and location information transmission unit may periodically or aperiodically feed back the measured average signal power information and location information to the BS. The BS may construct a UE set using the location information fed back from the UE, and may perform macroprocessing using the average signal power. The data transceiver may transmit data information sent from the UE to BSs contained in the cooperative cell, or may receive data information from the BSs contained in the cooperative cell.

Referring to FIG. 18(a), the UE memory may include an average signal power storage unit and a location information storage unit. The average signal power storage unit may store the signal power received from BSs of the neighbor cells measured by the average signal power measurement unit, and the location information storage unit may store the location information measured by the location information measurement unit.

Referring to FIG. 18(b), the BS processor may include an average signal power measurement unit, a location information measurement unit, an set decision unit, an set information exchange unit, a microfilter decision unit, a signal information exchange unit, a macrofilter decision unit, and a data transceiver. The average signal power measurement unit may accumulate the average signal power received from the UEs (including UEs of the BS cell) of the neighbor cells of the BS, and may measure the accumulated average signal power. The measured average signal power may be used for macroprocessing. The location information measurement unit may measure the UE location. The measured location information may be used for the set decision unit to decide the UE set. The set decision unit may construct (or update) the cooperative detection UE set, the cooperative processing UE set, and the cooperative processing cell set. The set information exchange unit may exchange (or share) the cooperative detection UE set information between BSs of the cell participating in cooperation, the cooperative processing UE set information, and the cooperative processing cell set information. The microfilter decision unit may generate the microfilter using the small-scale fading information so as to allow each UE to receive signals of UEs contained in the cooperative processing UE set. The signal information exchange unit may exchange the microprocessed signals between the BSs of the cell participating in cooperation. In this case, the microprocessed signals may be exchanged through a backhaul system or a CPU (Central Processing Unit). The macrofilter decision unit may generate the macrofilter using the large-scale fading information, and may process the microprocessed signal obtained from the BSs of the cooperative cell. The data transceiver may detect signals of UEs contained in the cooperative detection UE set through the macroprocessed signal.

Referring to FIG. 18(b), the BS memory may include an average signal power storage unit, a location information storage unit, an set storage unit, a microfilter result storage unit, and a macrofilter result storage unit. The average signal power storage unit may store the average signal power information between the UE and the BS. The BS may accumulate and store the measured average signal power, and may also store location information that has been measured by the UE and then fed back to the BS. The set storage unit may store the cooperative detection UE set, the cooperative processing UE set, and the cooperative processing cell set information, which are decided by the set decision unit of the BS. The microfilter result storage unit may allow each BS to store the result decided by the microfilter decision unit, and may also store the other result decided by BSs of other cells exchanged by the signal information exchange unit. The macrofilter result storage unit may store the macroprocessing result processed by the macrofilter decided by the macrofilter decision unit.

Figure 19:
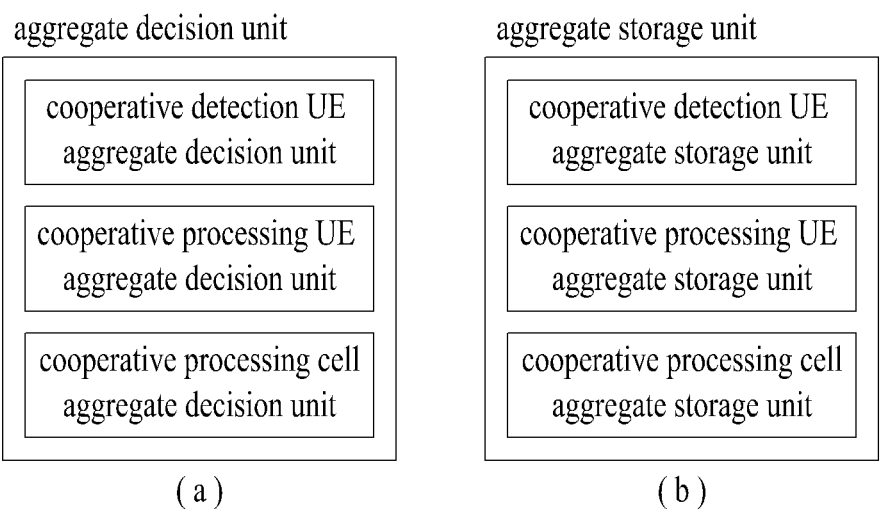
FIG. 19 is a block diagram illustrating an set decision unit and an set storage unit of a base station (BS) according to an embodiment of the present invention.

FIG. 19 is a block diagram illustrating an set decision unit and an set storage unit of a base station (BS) according to an embodiment of the present invention.

Referring to FIG. 19(a), the set decision unit may include a cooperative detection UE set decision unit, a cooperative processing UE set decision unit, and a cooperative processing cell set decision unit. The cooperative detection UE set decision unit may classify all UEs participating in cooperation into a plurality of sets without overlapping (a specific UE may be contained in one cooperative detection UE set). The UEs participating in cooperation may be classified according to BSs to which the UEs belong, and may decide the cooperative detection UE set. In addition, the UEs participating in cooperation may group the neighbor UEs using UE location information, and may also decide the cooperative detection UE set according to the grouping result. The UEs participating in cooperation may group UEs having similar large-scale fading information using large-scale fading information, and may decide the cooperative detection UE set according to the grouping result. The cooperative processing UE set decision unit may classify all UEs participating in cooperation in an overlapping manner. The cooperative processing UE set may be identical to the cooperative detection UE set. The cooperative processing UE set of a specific cooperative detection UE set may include its own cooperative detection UE set, and may construct a union of a plurality of neighbor cooperative detection UE sets. The cooperative processing cell set may include BSs including all UEs contained in a given cooperative detection UE set. The cooperative processing cell set may include BSs having all UEs contained in the cooperative processing UE set. Alternatively, BSs of all cells may also be contained in the cooperative processing cell set.

Referring to FIG. 19(b), the set storage unit may include a cooperative detection UE set storage unit, a cooperative processing UE set storage unit, and a cooperative processing cell set storage unit. The cooperative detection UE set storage unit may store the cooperative detection UE set information decided by the cooperative detection UE set decision unit. The cooperative processing UE set storage unit may store the cooperative processing UE set information decided by the cooperative processing UE set decision unit. The cooperative processing cell set storage unit may store the cooperative processing cell set information decided by the cooperative processing cell set decision unit.

INDUSTRIAL APPLICABILITY

The aforementioned embodiments of the present invention have been described in terms of a multi-cell cooperative communication (CoMP) system, but the present invention may be applied to various mobile communication systems using the same or equivalent principles.

The invention claimed is:

1. A method for receiving a signal by a first base station (BS) in a wireless communication system, the method comprising:
generating, by the first BS, first cooperative detection user equipment (UE) set information by searching for one or more UEs served by the first BS;
acquiring, by the first BS, second cooperative detection UE set information detected by a second BS, from the second BS, wherein the second BS is one of cooperative BSs adjacent to the first BS;

updating, by the first BS, cooperative processing UE set information of the first BS based on the first cooperative detection UE set information and the second cooperative detection UE set information;

updating, by the first BS, cooperative processing cell set information of the first BS based on the cooperative processing UE set information; and receiving, by the first BS, a signal from a UE of the one or more UEs, based on the updated cooperative processing UE set information and the updated cooperative processing cell set information, wherein the updating of the cooperative processing cell set information is performed by acquiring information of a third BS contained in the cooperative processing UE set information, wherein the third BS is one of cooperative BSs adjacent to the second BS, wherein the first cooperative detection UE set information includes location information of the one or more UEs of the first BS and a set of unique UE identifiers of the first BS, wherein the cooperative processing cell set information includes a set of unique BS identifiers of more than one BS, and wherein the generating the first cooperative detection UE set information comprises generating the first cooperative detection UE set information by further considering location information of at least one of neighbor UEs of a location measurement UE received from the location measurement UE.

2. The method according to claim 1, wherein the receiving the signal from the UE of the one or more UEs includes:

performing a first filtering process for removing an interference signal of a UE served by the first BS; and performing a second filtering process for removing an interference signal of a UE not served by the first BS.

3. The method according to claim 2, wherein a filter for use in the first filtering process and the second filtering process is a maximum ratio combining (MRC) filter.

4. The method according to claim 1, wherein the first cooperative detection UE set information includes average signal power information of the UE of the one or more UEs.

5. The method according to claim 1, wherein the first BS shares information with the second BS and the third BS through a backhaul server.

6. The method according to claim 1, wherein the first BS is independently detected per cooperative detection UE of the cooperative detection UE set information.

7. The method according to claim 1, wherein the unique BS identifiers and unique UE identifiers are stored, as a list form, in the first BS.

8. The method according to claim 1, further comprising:

transmitting, by the first BS, an acknowledgement (ACK) signal in response to signal transmission of the UE of the one or more UEs.

9. The method according to claim 1, wherein a cell of the first BS includes at least one sub-cell, and the first cooperative detection UE set information is constructed per sub-cell.

10. A first base station (BS) for transmitting and receiving a signal to and from one or more user equipments (UEs) in a wireless communication system, the first BS comprising:

a transceiver; and a processor, wherein the processor is configured to:

generate first cooperative detection UE set information by searching for the one or more UEs served by the first BS, acquire second cooperative detection UE set information detected by a second BS from the second BS, update cooperative processing UE set information of the first BS based on the first cooperative detection UE set and the second cooperative detection UE set information, update a cooperative processing cell set information of the first BS based on the cooperative processing UE set information, and receive a signal from a UE of the one or more UEs based on the updated cooperative processing UE set information and the updated cooperative processing cell set information, wherein the updating of the cooperative processing cell set information of the first BS is performed by acquiring information of a third BS contained in the cooperative processing UE set information, wherein the second BS is one of cooperative BSs adjacent to the first BS, wherein the third BS is one of cooperative BSs adjacent to the second BS, wherein the first cooperative detection UE set information includes location information of the one or more UEs of the first BS and a set of unique UE identifiers of the first BS, wherein the cooperative processing cell set information includes a set of unique BS identifiers of more than one BS, and wherein the processor is configured to generate the first cooperative detection UE set information by further considering location information of at least one of neighbor UEs of a location measurement UE received from the location measurement UE.

* * * * *